(12) United States Patent
Jo et al.

(10) Patent No.: US 12,549,388 B1
(45) Date of Patent: Feb. 10, 2026

(54) UTILIZING TWO-TERMINAL RESISTIVE SWITCHING MEMORY TO STORE VALIDATION DATA OF AN INTEGRATED CIRCUIT DEVICE

(71) Applicant: Crossbar, Inc., Santa Clara, CA (US)

(72) Inventors: Sung Hyun Jo, Sunnyvale, CA (US); Zhi Li, Santa Clara, CA (US); Amit Prakash, Santa Clara, CA (US)

(73) Assignee: Crossbar, Inc., Santa Clara, CA (US)

( * ) Notice: Subject to any disclaimer, the term of this patent is extended or adjusted under 35 U.S.C. 154(b) by 212 days.

(21) Appl. No.: 18/200,318

(22) Filed: May 22, 2023

(51) Int. Cl.
*H04L 29/00* (2006.01)
*H04L 9/30* (2006.01)
*H04L 9/32* (2006.01)
*H10B 63/00* (2023.01)

(52) U.S. Cl.
CPC .......... *H04L 9/3268* (2013.01); *H04L 9/3073* (2013.01); *H04L 9/3247* (2013.01); *H04L 9/3278* (2013.01); *H10B 63/80* (2023.02)

(58) Field of Classification Search
CPC ... H04L 9/3268; H04L 9/3073; H04L 9/3247; H04L 9/3278; H10B 63/80
See application file for complete search history.

(56) References Cited

U.S. PATENT DOCUMENTS

| | | | | |
|---|---|---|---|---|
| 9,979,725 B1* | 5/2018 | Liu | | H04L 63/10 |
| 10,924,278 B2* | 2/2021 | McGough | | H04L 63/062 |
| 10,951,418 B1* | 3/2021 | Graziano | | H04L 9/3263 |
| 11,228,443 B2* | 1/2022 | Troia | | G06F 3/0659 |
| 11,646,903 B1* | 5/2023 | Rosenoer | | H04L 9/3268 713/189 |
| 2015/0319160 A1* | 11/2015 | Ferguson | | H04L 63/12 726/10 |
| 2017/0280320 A1* | 9/2017 | Caceres | | H04W 12/35 |
| 2019/0356529 A1 | 11/2019 | Gulati | | |
| 2020/0092328 A1* | 3/2020 | Kim | | G06F 12/1081 |
| 2020/0322148 A1* | 10/2020 | McGough | | H04L 9/0838 |
| 2020/0387923 A1* | 12/2020 | Mitchell | | G06Q 20/387 |
| 2021/0091952 A1* | 3/2021 | Wentz | | H04L 9/3278 |
| 2022/0051718 A1 | 2/2022 | Asnaashari et al. | | |
| 2022/0129259 A1* | 4/2022 | Shiner | | G06Q 30/0601 |
| 2022/0129389 A1* | 4/2022 | Shiner | | G06F 12/1408 |
| 2022/0129390 A1* | 4/2022 | Shiner | | G06F 12/1433 |
| 2022/0129391 A1* | 4/2022 | Shiner | | H04W 12/61 |
| 2022/0131700 A1* | 4/2022 | Shiner | | H04L 9/3278 |
| 2022/0131846 A1* | 4/2022 | Shiner | | H04L 9/3268 |

(Continued)

OTHER PUBLICATIONS

Extended European Search report for European Patent Application No. 24177297.9, dated Oct. 22, 2024, 8 pages long.

*Primary Examiner* — Don G Zhao
(74) *Attorney, Agent, or Firm* — Wegman Hessler Valore

(57) ABSTRACT

An electronic device can be validated at a circuit-level or device-level to provide supply chain verification of an integrated circuit (IC) product. A modern integrated circuit package can comprise multiple dies, systems and circuitry built from a variety of device-level structures. Device-level verification disclosed herein can confirm that a device-level (sub-) component of an integrated circuit product is sourced by a known or otherwise valid manufacturer. This serves to mitigate or avoid a hacking attempt involving illicit replacement of a component of an IC product by an intermediate handler of the IC product within a supply chain.

13 Claims, 12 Drawing Sheets

(56) References Cited

U.S. PATENT DOCUMENTS

| | | | |
|---|---|---|---|
| 2022/0131847 A1* | 4/2022 | Shiner | H04L 9/0866 |
| 2022/0131848 A1* | 4/2022 | Shiner | H04W 12/48 |
| 2022/0132298 A1* | 4/2022 | Shiner | H04W 12/04 |
| 2023/0125636 A1 | 4/2023 | Dover | |
| 2023/0370446 A1* | 11/2023 | Shiner | H04L 9/3265 |

* cited by examiner

UTILIZING TWO-TERMINAL RESISTIVE SWITCHING MEMORY TO STORE VALIDATION DATA OF AN INTEGRATED CIRCUIT DEVICE

INCORPORATION BY REFERENCE

U.S. patent application Ser. No. 17/223,817 filed Apr. 6, 2021 and titled "DISTINCT CHIP IDENTIFIER SEQUENCE UTILIZING UNCLONABLE CHARACTERISTICS OF RESISTIVE MEMORY ON A CHIP", is hereby incorporated by reference in its entirety and for all purposes.

TECHNICAL FIELD

The subject disclosure relates generally to two-terminal memory devices, and as one illustrative example, physical unclonable function differential programming of multiple two-terminal memory cells connected by a wordline.

BACKGROUND

Resistive-switching memory represents a recent innovation within the field of integrated circuit technology. While much of resistive-switching memory technology is in the development stage, various technological concepts for resistive-switching memory have been demonstrated and are in one or more stages of verification to prove or disprove associated theories or techniques. Resistive-switching memory technology is expected to show compelling evidence of substantial advantages over competing technologies in the semiconductor electronics industry in the near future.

Proposals for practical utilization of resistive-switching technology to memory applications for electronic devices have been put forth. For instance, resistive-switching elements are often theorized as viable alternatives, at least in part, to metal-oxide semiconductor (MOS) type memory transistors employed for electronic storage of digital information. Models of resistive-switching memory devices provide some potential technical advantages over non-volatile FLASH MOS type transistors, for instance.

In addition to memory elements, volatile resistive-switching elements have been proposed in conjunction with a MOS transistor for a high-speed non-volatile memory device, or as a high-speed field actuated switch, or selector device. Still further, stochastic characteristics of resistive-switching structures have been proposed by the inventor as suitable for generating non-correlated data for random number generation, or similar applications. Each of these applications has met different needs for electronic memory applications or specialty data generation applications.

In light of the above, the Assignee of the present disclosure continues to develop and pursue practical utilizations of resistive-switching technology.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Embodiments of the present disclosure provide for supply chain verification of an integrated circuit, as well as components or sub-components thereof even to a device-level scale. A modern integrated circuit package can comprise multiple IC products, which in turn can comprise one or more dies. On an even smaller scale, each IC die can comprise complex electronic systems and circuitry built from a variety of device-level structures. Device-level verification provided herein can confirm that a device-level (sub-) component of an integrated circuit product is sourced by a known or otherwise valid manufacturer. This serves to mitigate or avoid a hacking attempt involving illicit replacement of a component of an IC product by an intermediate handler of the IC product within a supply chain.

In at least one disclosed embodiment, the IC product can be a digital hard wallet utilized for storing cryptocurrency. In another embodiment, an IC product can be a secure storage device for storing electronic documents such as legal documents, title documents, a chain of title or ownership, a contract(s), and so forth. In still other embodiments, an IC product can be a secure storage device for storing like digital assets or records, or a suitable combination of the foregoing.

In further disclosed embodiments, provided is an integrated circuit (IC) device. The IC device can comprise a memory control unit (MCU) device packaged within the integrated circuit device and comprising a first embedded memory that stores a MCU identifier associated with the MCU device. Moreover, the IC device can comprise a secure element (SE) device packaged within the integrated circuit device and comprising a second embedded memory that stores a SE identifier for the SE device, and can comprise a two-terminal resistive switching memory (ReMEM) device comprising a plurality of ReMEM memory cells. In an embodiment(s), a ReMEM identifier can be stored within a first subset of the plurality of ReMEM memory cells of the two-terminal ReMEM device. In still further embodiments, the IC device can comprise a digital certificate stored in a second subset of the plurality of ReMEM memory cells. The digital certificate can include a validation code for the MCU identifier, a second validation code for the SE identifier and a third validation code for the ReMEM identifier according to alternative or additional embodiments.

In one or more aspects of the disclosed embodiments, provided is a method for validating an electronic device. The method can comprise: receive a set of encrypted data at the electronic device comprising a data message and a digital signature pertaining to the data message, and retrieve a valid public key stored at a memory control unit (MCU) of the electronic device and decrypt the digital signature with the valid public key to derive a decrypted signature. Additionally, the method can comprise: determine whether the decrypted signature matches the data message and validate the set of encrypted data as originating at an authentic source device associated with the electronic device in response to the decrypted signature matching the data message. Further to the above, the method can comprise: access a resistive switching memory device contained within the electronic device and retrieve a digital certificate containing a signed validation code associated with a component of the electronic device stored in resistive switching memory cells of the resistive switching memory device, wherein the signed validation code is a validation code of the component that is digitally signed with a second validation code associated with an authorized source of the component of the electronic device. Still further, the method can comprise: generate a message containing the digital certificate retrieved from the resistive switching memory device and transmit the message in response to the set of encrypted data, and receive a second set of encrypted data comprising a second data message encrypted with the validation code. According to other embodiments the method can additionally comprise: provide the second data message to the component of the electronic device and receive a decrypted message from the component of the electronic device, and generate a second message containing the decrypted message in response to the second set of encrypted data and output the second message in response to the second data message. In still further embodiments, the method can comprise: receive a response to the second message validating the component of the electronic device in response to the authentic source device verifying that the decrypted message matches the second data message.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of the subject disclosure may be practiced without these specific details, or with other methods, components, materials, etc. In other instances, well-known structures and devices are shown in block diagram form to facilitate describing the subject disclosure.

DETAILED DESCRIPTION

Introduction

Figure 1:
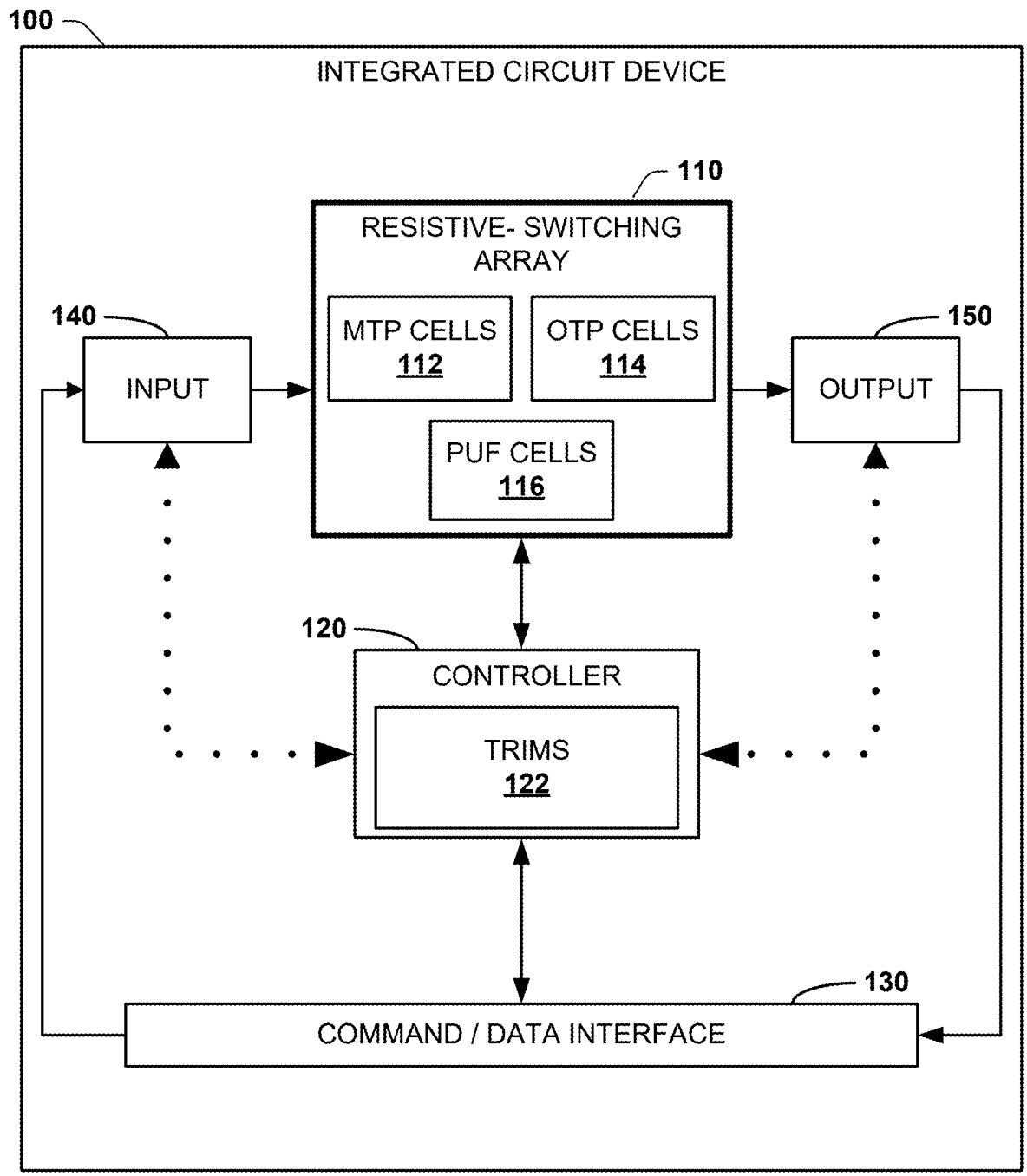
FIG. 1 depicts a block diagram of an example integrated circuit device comprising a resistive switching memory array, in disclosed embodiments.

Threats to security and validity of electronic devices by way of hacking and illicit access are widespread. Mechanisms to properly authenticate a finished product include cryptography, virtual private networking, combinations of these and others. In the event that an electronic device is properly validated as authentic but a component or subcomponent of the electronic device becomes compromised, however, a hacking attempt might still be successful. To illustrate, illicit modification or substitution of a nonvolatile memory, a firmware, encryption keys, introduction of a backdoor, or the like, can compromise a component of an electronic device. Given the complexity of modern supply chains and the potentially varied manufacturing inputs involved in producing a final product as well as different entities within a sales or distribution chain, many vectors exist to compromise a component of a finished product. When a single compromised component can in turn compromise the electronic device, a means to authenticate individual components independent of intermediate handlers becomes relevant.

Aspects of the disclosed embodiments provide device-level validation for components of an integrated circuit (IC) product. A device-level component can be as small as a logic device in various embodiments. Examples of suitable logic devices can include: a fixed logic device (e.g., discrete logic gates with fixed function or operation), as well as a programmable logic device (PLD) and variations (e.g., a simple PLD (SPLD), programmable array logic (PAL), programmable logic array (PLA), erasable PLD (EPLD), generic array logic (GAL), complex PLD (CPLD), field programmable gate array (FPGA), and others). A device-level component can be a microprocessor, a memory, a fixed logic device, a PLD, an IC, an application specific IC (ASIC), a field programmable object array (FPOA), a tensor processing unit (TPU), or the like, or suitable combinations of the foregoing. A device-level memory can be an embedded memory, an array of memory, a three dimensional (3D) array of memory, a floating gate memory, a two-terminal memory, a front-end of line memory (e.g., within a diffusion layer) or a back-end of line memory (e.g., constructed among metal layers of an IC).

In addition to the foregoing, embodiments of the present disclosure provide for validation of multiple device-level components, such as simple or complex circuits or systems within an IC die. A controller comprising a microprocessor, an embedded memory, a firmware and set of fixed logic gates and a set of programmable logic gates for storing trim instructions can be a circuit (or system) that can be validated by aspects of the present disclosure. In other aspects, a two-terminal memory array including peripheral access circuitry, time clock(s), sense amps, input state machine, output register, and so forth (e.g., see FIG. 9, infra) can be a circuit (or system) that can be validated. In still other aspects, a secure element that provides isolation, storage and processing of a security related application for a secure electronic device can be validated by embodiments described herein.

Figure 2:
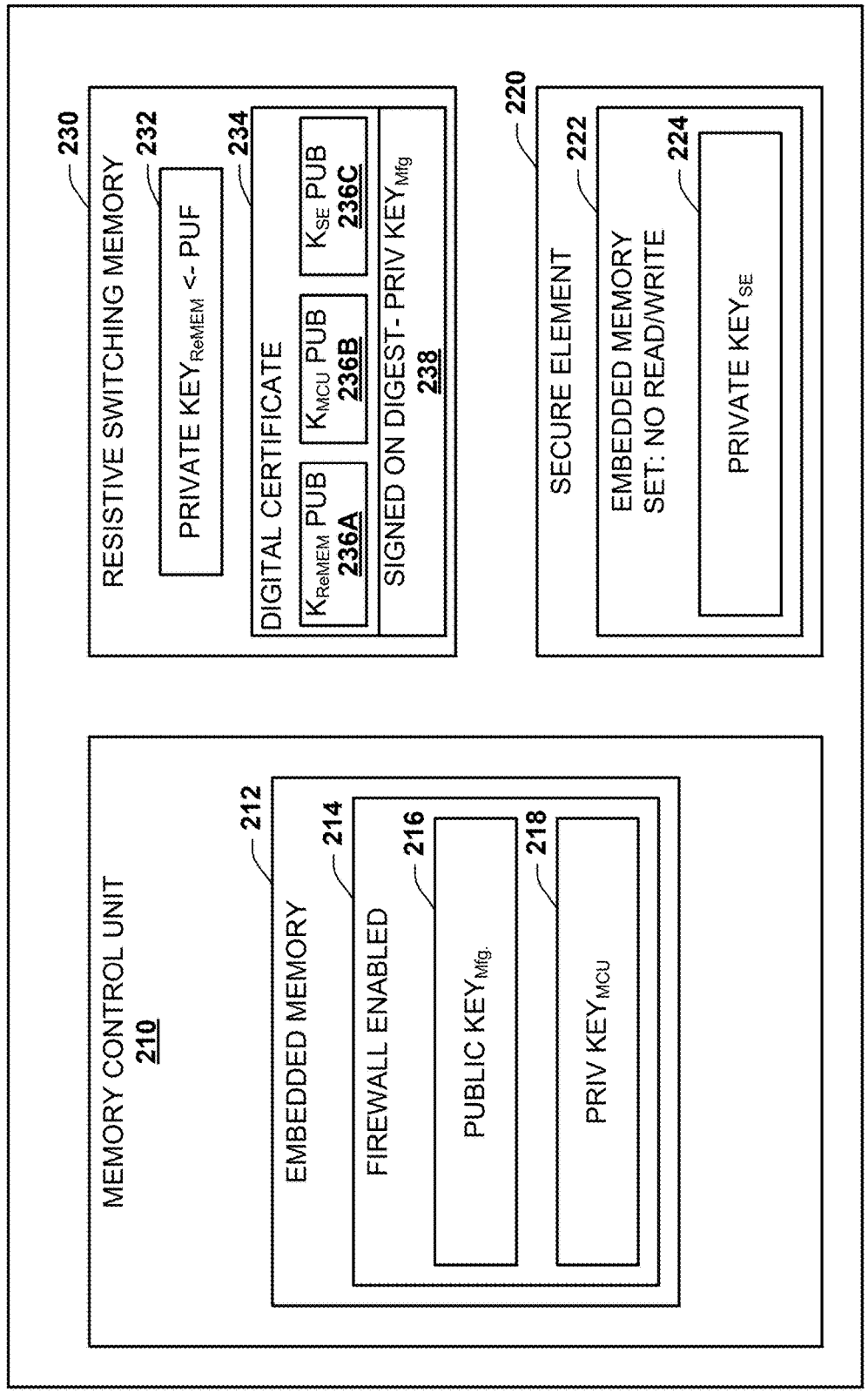
FIG. 2 illustrates a block diagram of an example electronic device configured for supply chain validation of components of the electronic device, in an embodiment(s)

As one example: a digital hard wallet comprising a secure element, a resistive memory array and a memory controller can be validated on the product level and on the component level (e.g., see FIG. 2, infra).

In some aspects of the present disclosure, filamentary resistive switching nonvolatile memory can be utilized for secure storage of information pertaining to device-level validation of an IC product. In at least some embodiments, a non-volatile resistive memory (ReMEM) that leverages atomic-scale filament formation (and deformation) to define measurably distinct states can be employed to store or even generate such information. For instance, an identifier or validation code can be assigned to a component of an electronic device and stored in ReMEM as part of an authentication framework for validating the component of the electronic device. In at least some embodiments, the validation code can be generated within ReMEM itself as part of a physical unclonable function (PUF) data generation process. ReMEM can be highly resistant to side-channel attacks (e.g., see FIGS. 3A, 3B, 4 and 5, infra) and PUF data generated within ReMEM can meet or exceed very high standards of randomness, minimizing both side-channel hacking attempts as well as brute-force replication processing.

Embodiments of the present disclosure leverage stochastic or substantially stochastic physical characteristics of nano-scale resistive switching devices to generate data. Being generally random, stochastic features of resistive switching devices can be leveraged to produce data that has little to no correlation among a population of such devices. As a result, that data can be suited to applications requiring distinct or unique identification, such as identification and authorization applications pertaining to an IC product or a component(s) or sub-component thereof. More particularly, highly non-correlated data can also be utilized for security applications, such as random number generation, cryptography key generation and validation applications, and the like.

Some disclosed embodiments propose aggregation of multiple memory cells to define a single bit: also called an identifier bit, a differential bit, a PUF bit, and the like. Program processes to generate data for PUF bit defined by multiple cells are disclosed herein, and referred to generally as differential program processes (e.g., see FIG. 4, infra). In some embodiments, a differential program process applying a program cycle concurrently to all memory cells defining an identifier bit is provided. In various disclosed aspects of such embodiments, differential programming can include detection of a program event(s) for one (or a group) of the memory cells and disconnection of the multiple cells from supply voltage. Other aspects include intrinsic suppression of non-programmed memory cells in response to a program event for one (or a group) of the memory cells. These aspects can mitigate or avoid invalid data results for differential programming, as well as reduce power consumption.

Figure 4:
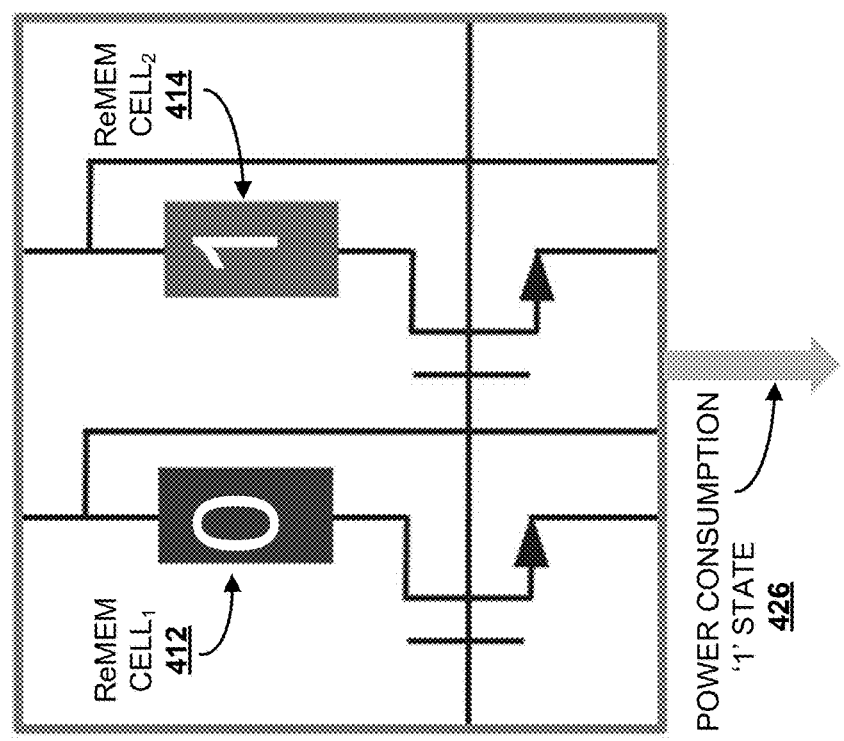
FIG. 4 illustrates a schematic diagram of an example differential physical unclonable function bit defined by multiple resistive switching cells in another embodiment.
Figure 4:
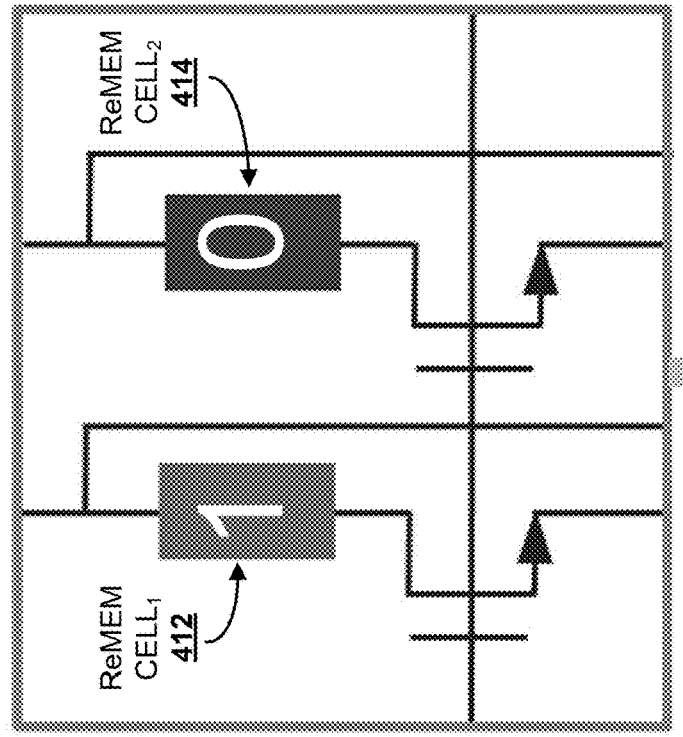

More generally, processes that employ stochastic physical characteristics of ReMEM memory cells to generate non-correlated data can also be referred to as physical unclonable function (PUF) processes, physically unclonable feature (also PUF) processes, physical (ly) unclonable features, or other suitable nomenclature. Data produced by such processes can be utilized as PUF data, but also as Root of Trust data or other secure validation data. Data derived from such stochastic physical characteristics are referred to herein as PUF data (or a PUF bit, or group of PUF bits, etc.) and generally involve a resistive switching cell process applied to one or more resistive switching cells that define a PUF bit(s) (e.g., see U.S. patent application Ser. No. 17/223,817 filed Apr. 6, 2021, incorporated by reference hereinabove). PUF data can be generated from a cell process(es) applied to native resistive switching memory cells (sometimes referred to as virgin resistive switching memory cells) that have not had a memory process previously applied to those memory cells, following manufacture. Example memory processes can include a forming process (e.g., comprising one or more electrical forming pulses), a program process (e.g., comprising one or more electrical program pulses), an erase process (e.g., comprising one or more electrical erase pulses), an overwrite process, and so forth. In addition, PUF data generated from non-volatile resistive switching memory cells can thereafter be stored and read from at least a subset of the non-volatile resistive switching memory cells utilized to generate the PUF data. In at least some disclosed embodiments, a PUF generation process can be rendered permanent through a one-time programmable process(es) applied to a bit that becomes programmed in response to the PUF generation process, and that defines a PUF bit or a portion of a PUF bit (e.g., as in the case of a differential PUF bit as shown in FIG. 4, infra).

Integrated circuit techniques for fabricating resistive switching memory can cause physical properties having the stochastic or substantially stochastic characteristics desired for generating PUF data. For instance, these physical properties can have little or no replication or repetition among fabricated memory cells made by the same process. As one example, one or more layers of a disclosed resistive switching device can have a root mean square (RMS) surface roughness of >0.2 nm, up to a maximum of about 10.0 nm surface roughness, in an embodiment. This results in random or near-random variation in layer thickness, including unpredictable changes in physical characteristics of such devices. In some theoretical models the RMS surface roughness can affect the geometry of a resistive switching material layer inducing stochastic or substantially stochastic variations in resistive switching device properties such as: native or virgin (e.g., as fabricated) current conductance, program voltage, differential program voltage, program speed, differential program speed, among others disclosed throughout this specification. As further examples, different resistive-switching memory cells and cell technologies can have different discrete programmable resistances, different associated program/erase voltages, as well as other differentiating characteristics. In an embodiment, a resistive switching memory device resulting from a 28 nm photolithographic process with device size between about 50 nanometer (nm) width and about 130 nm width (e.g., about 100 nm width, about 56 nm width, about 75 nm width, about 128 nm width, and so forth) can be suitable to achieve stochastic physical characteristics disclosed herein. In other embodiments, a 22 nm photolithographic process producing a device size between 40 nm and 100 nm width (e.g., about 44 nm width, about 60 nm width, about 66 nm width, about 88 nm width, and so forth) can achieve stochastic physical characteristics.

Stochastic physical characteristics can be utilized by a PUF data generation process to produce PUF data from a ReMEM memory cell(s). For instance, a native electrical resistance of a resistive switching layer (RSL) can depend at least in part on these non-correlated physical features and can vary from device to device even for adjacent devices in a single array on a single die (and, as previously stated, among multiple dies, wafers, and so on). A PUF data generation process leveraging native electrical resistance of ReMEM memory cells can produce suitable PUF data. As another example, a current flow through the RSL in a native un-programmed state, a program voltage in the native un-programmed state, a program speed in the native un-programmed state, differential program voltage/current/speed in the native un-programmed state, and so on, can vary among resistive switching devices. PUF data generation processes leveraging these or combinations of these features of ReMEM devices can provide excellent non-correlated PUF data sequences.

As utilized herein, the term "native", "original", "virgin" or the like refers to post-fabrication but pre-commercial operation of resistive switching devices on a semiconductor die. Native (and like terminology) need not exclude some or all post-fabrication operations such as quality testing or other verification routines performed by a manufacturer, and even some pre-commercial operation by a non-manufacturer such as testing to ensure manufacturer quality specifications are met by a chip, chip setup routines or configuration routines (e.g., defining one-time programmable memory or identifier memory within an array of resistive switching memory; see e.g., FIG. 1, infra), among others. In general, a resistive switching device is in a native state, as utilized herein, if it has not yet received a stimulus (e.g., electrical, thermal, magnetic, or a like stimulus known in the art, suitable combinations thereof, and so forth) suitable to form a conductive filament within the resistive switching device and change the resistive switching device from an electrically resistive state to an electrically conductive state as described herein or known in the art.

As the name implies, a two-terminal resistive switching device has two terminals or electrodes. Herein, the terms "electrode" and "terminal" are used interchangeably. Generally, a first electrode of a two-terminal resistive switching device is referred to as a "top electrode" (TE) and a second electrode of the two-terminal resistive switching device is referred to as a "bottom electrode" (BE), although it is understood that electrodes of two-terminal resistive switching devices can be according to any suitable arrangement, including a horizontal arrangement in which components of a memory cell are (substantially) side-by-side rather than overlying one another. Between the TE and BE of a two-terminal resistive switching device is typically an interface layer sometimes referred to as a switching layer, a resistive switching medium (RSM) or a resistive switching layer (RSL); such devices are not limited to these layers, however, as one or more barrier layer(s), adhesion layer(s), ion conduction layer(s), seed layer(s), particle source layer(s) or the like—as disclosed herein, disclosed within a publication incorporated by reference herein, as generally understood and utilized in the art or reasonably conveyed to one of ordinary skill in the art by way of the context provided herein and its addition to the general understanding in the art or the incorporated publications—may be included between or adjacent one or more of the TE, the BE or the interface layer consistent with suitable operation of such device.

Composition of memory cells, generally speaking, can vary per device with different components, materials or deposition processes selected to achieve desired characteristics (e.g., stoichiometry/non-stoichiometry, volatility/non-volatility, on/off current ratio, switching time, read time, memory durability, program/erase cycle, and so on). One example of a filamentary-based resistive switching device can comprise: a conductive layer (e.g., a metal, metal-alloy, metal-nitride such as: TiN, TaN, TiW, or the like, or other suitable metal compounds), an optional interface layer (e.g., doped p-type (or n-type) silicon (Si) bearing layer such as: a p-type or n-type Si bearing layer, p-type or n-type polysilicon, p-type or n-type polycrystalline SiGe, etc.), a resistive switching layer (RSL) and an active metal-containing layer capable of being ionized. Under suitable conditions, the active metal-containing layer can provide filament-forming ions to the RSL. In such embodiments, a conductive filament (e.g., formed by the ions) can facilitate electrical conductivity through at least a subset of the RSL, and a resistance of the filament-based device can be determined, as one example, by a tunneling resistance between the filament and the conductive layer. A memory cell having such characteristics may be described as a filamentary-based device.

For disclosed resistive switching filamentary-based devices, completion of a conductive filament can involve only a few particles (e.g., atoms, ions, conductive compounds, etc.) of conductive material, or less. As one particular example, an electrically continuous conductive filament could be established by position of 1-3 atoms at a boundary of a switching layer, whereas repositioning of one or more of these atoms can break that electrical continuity, in some embodiments. Because the scale is so small between a completed filament and non-completed filament, illicit side-channel attempts to read bits of memory—for example through high intensity microscopy (e.g., see FIGS. 3A and 3B, infra)—can be very difficult, if not impossible due to the difficulty of imaging such small particles and determining whether their location is sufficient to establish electrical continuity. Still further, disclosed resistive switching devices can be formed among metal lines of a semiconductor chip (e.g., among backend-of-line wiring layers; e.g., see FIG. 5, infra). The density of metal wiring layers further occludes visibility of the resistive switching devices, making common side-channel techniques unprofitable.

Referring again to composition of a filamentary resistive switching device, a RSL (which can also be referred to in the art as a resistive switching media (RSM)) can comprise, e.g., an undoped amorphous Si-containing layer, a semiconductor layer having intrinsic characteristics, a stoichiometric or non-stoichiometric silicon nitride (e.g., SiN, $Si_3N_4$, $SiN_x$, etc.), a Si sub-oxide (e.g., $SiO_x$ wherein x has a value between 0.1 and 2), a Si sub-nitride, a metal oxide, a metal nitride, a non-stoichiometric silicon compound, and so forth. Other examples of materials suitable for the RSL could include $Si_xGe_yO_z$ (where x, y and z are respective suitable positive numbers), a silicon oxide (e.g., SiON, where N is a suitable positive number), a silicon oxynitride, an undoped amorphous Si (a-Si), amorphous SiGe (a-SiGe), $TaO_B$ (where B is a suitable positive number), $HfO_C$ (where C is a suitable positive number), $TiO_D$ (where D is a suitable number), $Al_2O_E$ (where E is a suitable positive number) and so forth, a nitride (e.g., AlN, SiN), or a suitable combination thereof.

In some embodiments, a RSL employed as part of a non-volatile memory device (non-volatile RSL) can include a relatively large number (e.g., compared to a volatile selector device) of material voids or defects to trap neutral metal particles (e.g., at low voltage) within the RSL. The large number of voids or defects can facilitate formation of a thick, stable structure of the neutral metal particles. In such a structure, these trapped particles can maintain the non-volatile memory device in a low resistance state in the absence of an external stimulus (e.g., electrical power), thereby achieving non-volatile operation.

An active metal-containing layer for a filamentary-based memory cell can include, among others: silver (Ag), gold (Au), titanium (Ti), titanium-nitride (TiN) or other suitable compounds of titanium, nickel (Ni), copper (Cu), aluminum (Al), chromium (Cr), tantalum (Ta), iron (Fe), manganese (Mn), tungsten (W), vanadium (V), cobalt (Co), platinum (Pt), hafnium (Hf), and palladium (Pd). Other suitable conductive materials, as well as stoichiometric or non-stoichiometric: compounds, nitrides, oxides, alloys, mixtures or combinations of the foregoing or similar materials can be employed for the active metal-containing layer in some aspects of the subject disclosure. Further, a non-stoichiometric compound, such as a non-stoichiometric metal oxide/metal-oxygen or metal nitride/metal nitrogen (e.g., $AlO_x$, $AlN_x$, $CuO_x$, $CuN_x$, $AgO_x$, $AgN_x$, and so forth, where x is a suitable positive number or range of numbers, such as: $0<x<2$, $0<x<3$, $0<x<4$ or other number/range of numbers depending on metal compound, which can have differing values for differing ones of the non-stoichiometric compounds) or other suitable metal compound can be employed for the active metal-containing layer, in at least one embodiment.

In one or more embodiments, a disclosed filamentary resistive switching device can include an active metal layer comprising a metal-nitrogen selected from the group consisting of: $TiN_x$, $TaN_x$, $AlN_x$, $CuN_x$, WNx and $AgN_x$, where x is a positive number (or range of numbers) that can vary per metal-nitrogen material. In a further embodiment(s), the active metal layer can comprise a metal-oxygen selected from the group consisting of: $TiO_x$, $TaO_x$, $AlO_x$, $CuO_x$, WOx and $AgO_x$ where x is a positive number (or range of numbers) that can likewise vary per metal-oxygen material. In yet another embodiment(s), the active metal layer can comprise a metal oxygen-nitrogen selected from the group consisting of: $TiO_aN_b$, $AlO_aN_b$, $CuO_aN_b$, $WO_aN_b$ and $AgO_aN_b$, where a and b are suitable positive numbers/ranges of numbers. The disclosed filamentary resistive switching device can further comprise a switching layer comprising a switching material selected from the group consisting of: $SiO_y$, $AlN_y$, $TiO_y$, $TaO_y$, $AlO_y$, $CuO_y$, $TiN_x$, $TiN_y$, $TaN_x$, $TaN_y$, $SiO_x$, $SiN_y$, $AlN_x$, $CuN_x$, $CuN_y$, $AgN_x$, $AgN_y$, $TiO_x$, $TaO_x$, $AlO_x$, $CuO_x$, $AgO_x$, and $AgO_y$, where x and y are positive numbers (or ranges), and y is larger than x. Various combinations of the above are envisioned and contemplated within the scope of embodiments of the present invention.

In one example, a disclosed filamentary resistive switching device comprises a particle donor layer (e.g., the active metal-containing layer) comprising a stoichiometric or non-stoichiometric metal compound (or mixture) and a resistive switching layer. In one alternative embodiment of this example, the particle donor layer comprises a metal-nitrogen: $MN_x$, e.g., $AgN_x$, $TiN_x$, $AlN_x$, etc., and the resistive switching layer comprises a metal-nitrogen: $MN_y$, e.g., $AgO_y$, $TiO_y$, $AlO_y$, and so forth, where y and x are positive numbers (or ranges), and in some cases y is larger than x. In an alternative embodiment of this example, the particle donor layer comprises a metal-oxygen: $MO_x$, e.g., $AgO_x$, $TiO_x$, $AlO_x$, and so on, and the resistive switching layer comprises a metal-oxygen: $MO_y$, e.g., $AgO_y$, $TiO_y$, $AlO_y$, or the like, where y and x are positive numbers (or ranges), and in some cases y is larger than x. In yet another alternative, the metal compound of the particle donor layer is a $MN_x$ (e.g., $AgN_x$, $TiN_x$, $AlN_x$, etc.), and the resistive switching layer is selected from a group consisting of $MO_y$ (e.g., $AgO_y$, $TiO_y$, $AlO_y$, etc.) and $SiO_y$, where x and y are typically non-stoichiometric values, or vice versa in a still further embodiment.

As utilized herein, variables x, y, a, b, and so forth representative of values or ratios of one element with respect to another (or others) in a compound or mixture can have different values (or ranges) suitable for respective compounds/mixtures, and are not intended to denote a same or similar value or ratio among the compounds. Mixtures can refer to non-stoichiometric materials with free elements therein-such as metal-rich nitride or oxide (metal-oxide/nitride with free metal atoms), metal-poor nitride or oxide (metal-oxide/nitride with free oxygen/nitrogen atoms)—as well as other combinations of elements that do not form traditional stoichiometric compounds as understood in the art. Some details pertaining to embodiments of the subject disclosure can be found in the following U.S. patent applications that are licensed to the assignee of the present application for patent: application Ser. No. 11/875,541 filed Oct. 19, 2007 and application Ser. No. 12/575,921 filed Oct. 8, 2009; each of the foregoing patent applications are hereby incorporated by reference herein in their respective entireties and for all purposes in addition to those incorporated by reference elsewhere herein.

Some embodiments of the subject disclosure can employ a bipolar switching device that exhibits a first switching response (e.g., programming to one of a set of program states) to an electrical signal of a first polarity and a second switching response (e.g., erasing to an erase state) to the electrical signal having a second polarity. The bipolar switching device is contrasted, for instance, with a unipolar device that exhibits both the first switching response (e.g., programming) and the second switching response (e.g., erasing) in response to electrical signals having the same polarity and different magnitudes.

Following program or erase pulses, a read pulse can be asserted. This read pulse is typically lower in magnitude relative to program or erase pulses and typically insufficient to affect the conductive filament and/or change the state of the two-terminal memory cell. By applying a read pulse to one of the electrodes of the two-terminal memory, a measured current (e.g., Ion) when compared to a predetermined threshold current can be indicative of the conductive state of the two-terminal memory cell. The threshold current can be preset based on expected current values in different states (e.g., high resistance state current; respective currents of one or more low resistance states, and so forth) of the two-terminal memory device, suitable for a given two-terminal memory technology. For example, when the conductive filament has been formed (e.g., in response to application of a program pulse), the conductance of the cell is greater than otherwise and the measured current (e.g., Ion) reading in response to the read pulse will be greater. On the other hand, when the conductive filament is removed (e.g., in response to application of an erase pulse), the resistance of the cell is high because the interface layer has a relatively high electrical resistance, so the conductance of the cell is lower and the measured current (e.g., Ioff) reading in response to the read pulse will be lower. By convention, when the conductive filament is formed, the memory cell is said to be in the "on-state" with a high conductance. When the conductive filament is not extant, the memory cell is said to be in the "off-state". A memory cell being in the on-state or the off-state can be logically mapped to binary values such as, e.g., "1" and "0" (e.g., see FIG. 4, infra). It is understood that conventions used herein associated with the state of the cell or the associated logical binary mapping are not intended to be limiting, as other conventions, including an opposite convention can be employed in connection with the disclosed subject matter. Techniques detailed herein are described and illustrated in connection with single-level cell (SLC) memory, but it is understood that the disclosed techniques can also be utilized for multi-level cell (MLC) memory in which a single memory cell can retain a set of measurably distinct states that represent multiple bits of information.

As utilized herein, the term "substantially" and other relative terms or terms of degree (e.g., about, approximately, roughly, and so forth) are intended to have the meaning specified explicitly in conjunction with their use herein, or a meaning which can be reasonably inferred by one of ordinary skill in the art, or a reasonable variation of a specified quality(ies) or quantity(ies) that would be understood by one of ordinary skill in the art by reference to this entire specification (including the knowledge of one of ordinary skill in the art as well as material incorporated by reference herein). As an example, a term of degree could refer to reasonable manufacturing tolerances about which a specified quality or quantity could be realized with fabrication equipment. Thus, as a specific illustration, though non-limiting, for an element of a resistive switching device expressly identified as having a dimension of about 50 angstroms (A), the relative term "about" can mean reasonable variances about 50 A that one of ordinary skill in the art would anticipate the specified dimension of the element could be realized with commercial fabrication equipment, industrial fabrication equipment, laboratory fabrication equipment, or the like, and is not limited to a mathematically precise quantity (or quality). In other examples, a term of degree could mean a variance of +/−0-3%, +/−0-5%, or +/−0-10% of an expressly stated value, where suitable to one of ordinary skill in the art to achieve a stated function or feature of an element disclosed herein. In still other examples, a term of degree could mean any suitable variance in quality(ies) or quantity(ies) that would be suitable to accomplish an explicitly disclosed function(s) or feature(s) of a disclosed element. Accordingly, the subject specification is by no means limited only to specific qualities and quantities disclosed herein, but includes all variations of a specified quality(ies) or quantity(ies) reasonably conveyed to one of ordinary skill in the art by way of the context disclosed herein.

Overview

FIG. 1 illustrates a block diagram of an example integrated circuit device 100 for an electronic device (e.g., a secure device, a digital hard wallet, and the like) according to one or more embodiments of the present disclosure. Integrated circuit device 100 includes an array(s) 110 of two-terminal resistive-switching memory cells (though other magnetic switching or charge-trapping two-terminal memory cells can be utilized instead or in addition, in some disclosed embodiments). Array(s) 110 of memory can include resistive switching memory cells, and different portions of the resistive switching memory cells can be characterized (and re-characterized, where suitable) for different memory cell functions. Example memory cell functions can include physical identifier functions (e.g., PUF), one-time programmable (OTP) functions and many-time programmable (MTP) functions (also referred to as rewritable or program/erase functions). Different groups of memory cells of array(s) 110 are provided (or can be characterized) to implement these functions. As described herein, identifier functions can be implemented by way of multiple resistive-switching memory cells collectively defined as a PUF bit (e.g., see FIG. 4, infra), or by a single cell defining a PUF bit in other embodiments. Thus, depicted in FIG. 1 are PUF memory cells 116, OTP memory cells 114 as well as MTP or reversibly programmable memory cells 112. Array(s) 110 of resistive-switching memory cells can be characterized for other types of memory cell functions not specifically depicted in FIG. 1, where suitable.

In some disclosed embodiments, one or more of: PUF cells 116, OTP cells 114 and MTP cells 112 can be separate memory structures from array(s) 110 of memory. For example, OTP cells 114 can be located externally to array(s) 110 on a semiconductor chip in an embodiment. Alternatively, in other embodiments, OTP cells 114 (or MTP cells 112, or PUF cells 116) can be at least in part included within array(s) 110 of memory. For instance, OTP cells 114 can be embodied as an array among a set of arrays that form array(s) 110 of memory, a block of memory within such an array(s) 110, a set of pages within one or more blocks or arrays, or other suitable arrangement.

Figure 9:
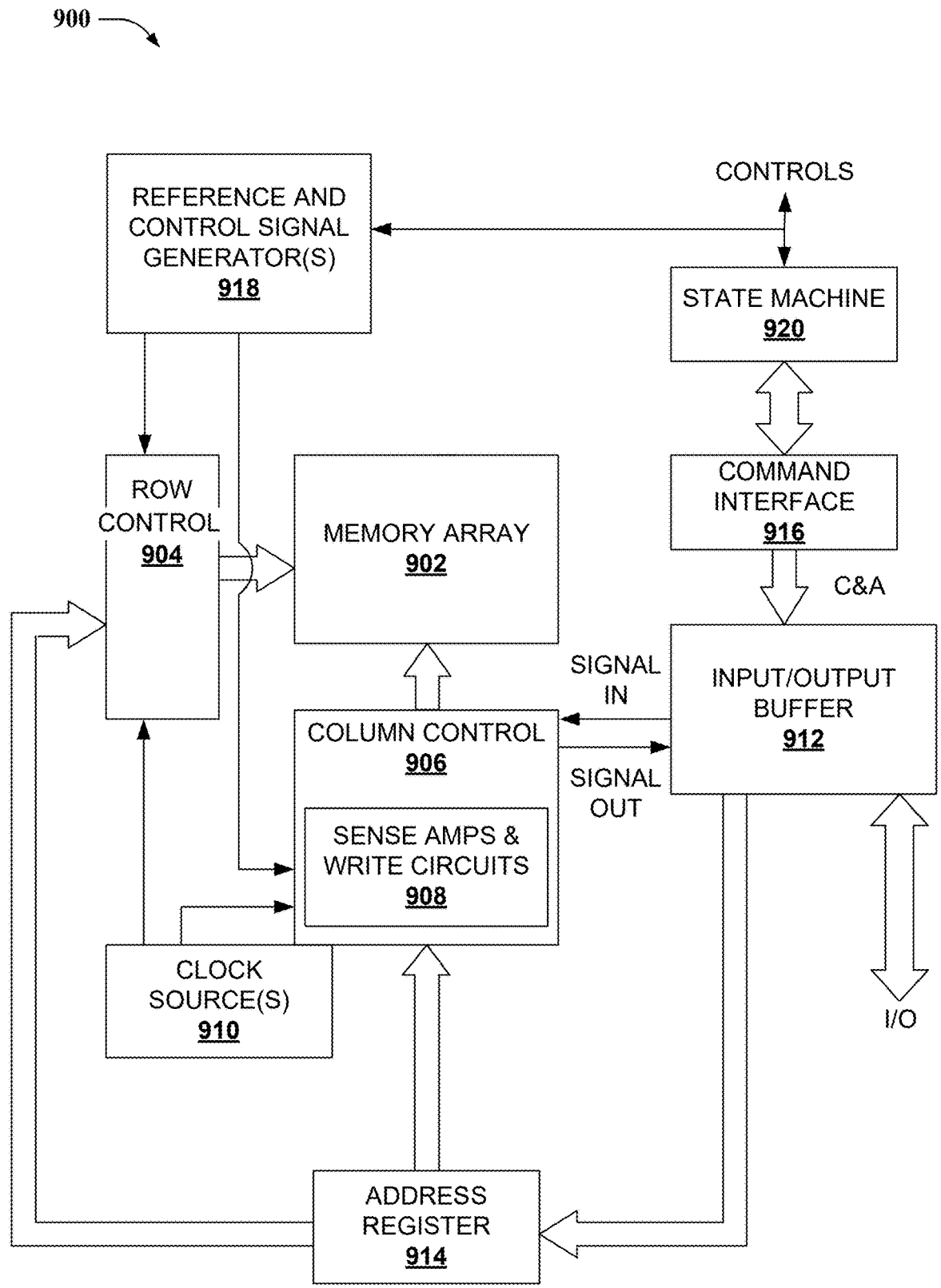
FIG. 9 illustrates a block diagram of an example electronic operating environment in accordance with one or more disclosed embodiments.

Controller 120 is provided to implement memory operations upon array(s) 110 of resistive-switching memory cells (e.g., see also FIG. 9, infra). Memory operations can include processes such as program (write), read, overwrite, erase, and so forth, operations suitable for operation of MTP cells 112. Memory operations can also include processes for program (write) or reading OTP cells 114. Still further, memory operations can include processes for generating PUF data on individual PUF cells 116, or on a group(s) of PUF cells 116 defining a differential PUF bit. Instructions for implementing memory operations according to the various characterizations can be stored in trim instructions 122. Memory cell operations can be implemented in response to a command from an external device (by way of command/data interface 130, for example), which can be implemented by a manufacturer post-fabrication of integrated circuit device 100, by a distributor or reseller of integrated circuit device 100 after fabrication, by an end-user as part of a chip calibration routine, or as a dynamic process during operation of integrated circuit device 100, according to various embodiments. As an illustrative example, a host device communicatively coupled to integrated circuit device 100 can issue a host command to generate PUF data; such a host command can include or imply a PUF characterization protocol on memory bits identified in the host command, or a command to characterize cells as a PUF bit(s) can be received separate from a command to generate PUF data from those cells. In various embodiments, trim instructions 122 can store protocols to characterize memory cells according to PUF, MTP, OTP characterizations, as well as implement memory operations consistent with those characterizations.

Controller 120 can be further operable to perform process (e.g., generation) and sensing operations pertaining to generating a PUF bit from one (or a group of) PUF cells 116. Examples of non-differential sensing operations pertaining to generating a PUF bit from a single memory cell can include: native current of a never-programmed PUF cell 116 in response to a sub-program voltage, native electrical resistance of a PUF cell 116, detection of program event(s), detection of speed or timing of program event(s), a program voltage, a program current, an on-state (programmed) resistance, an erase voltage or current, a delay frequency, a parasitic resistance or capacitance of a PUF cell 116, a program or erase minimum pulse width of a PUF cell 116, and so forth, or suitable combinations of the foregoing (e.g., as described within U.S. application Ser. No. 17/223,817 incorporated by reference hereinabove). In general, however, these sensing operations can be digitized to generate PUF data by comparing a measured result of one or more of the foregoing sensing operations (native current in response to sub-program voltage, detection of program event in response to a program signal, speed or timing of program event, a voltage at which a device becomes programmed, and so forth) to a threshold value stored in trim instructions 122 of controller 120.

As further examples, controller 120 can be operable to perform a program operation(s) pertaining to generating a PUF data bit utilizing a PUF cell(s) 116 of array(s) 110 of memory. Examples of such program operations include applying a program voltage magnitude to a never-programmed (or un-programmed for RNG data) memory cell and determining whether the cell is programmed or not programmed in response to the selected program voltage magnitude (program voltage magnitude differentiation). The PUF data bit can be digitized by assigning a '1' if the cell is programmed, and '0' if not programmed (or vice versa). Further examples include applying a program signal of selected pulse duration to a never-programmed (or un-programmed) memory cell and determining whether the cell is programmed or not programmed after the selected pulse duration (program time differentiation). Similar to the previous example, the PUF data bit can be digitized by assigning a '1' if the cell is programmed, and '0' if not programmed (or vice versa). Another example includes applying a sub-program voltage to a never-programmed (or un-programmed) memory cell and determining whether a native non-programmed current is above or below a preselected current threshold (native current differentiation). The PUF bit can be digitized by assigning a '1' if native current is above the threshold and assigning a '0' if native current is below the threshold (or vice versa). Other examples or combinations of the foregoing known in the art or reasonably suggested to one of ordinary skill in the art by way of the context provided herein are considered within the scope of the present disclosure.

In still other embodiments, controller 120 can be configured to implement differential operations pertaining to generating a PUF bit from a plurality of PUF cells 116. Generally, differential operations compare response of one or more cells of a plurality of memory cells to a memory operation and digitize an identifier bit associated with the plurality of memory cells based on relative responses of the one or more memory cells. Differential operations usable to generate a PUF bit according to aspects of the present disclosure can include: differential program speed of a group of never (or un) programmed memory cells, differential native program voltage of the group of memory cells, differential native (leak) current of the group of memory cells, differential native electrical resistance of the group of memory cells, differential on-state resistance of the group of memory cells, differential erase voltage or current of the group of memory cells, differential delay frequency of the group of memory cells, differential parasitic resistance or capacitance of the group of memory cells, a differential program or erase minimum pulse width or duration of the group of memory cells, or the like, or a suitable combination of the foregoing. For differential operations, using the exemplary case of two cells per identifier bit (though the rule can be extended to three or more cells per identifier bit through proportional logic, optionally for generating multi-bit PUF data with suitable numbers of differential cells), the PUF bit can be digitized by assigning a '0' value to PUF bits in which a first memory cell has higher (or lower) native current/on-state resistance/erase voltage/delay frequency/parasitic resistance or capacitance/program or erase speed, etc., and assigning a '1' to PUF bits in which a second memory cell has the higher (or lower) native current/on-state resistance/erase voltage/delay frequency/parasitic resistance or capacitance/program or erase speed, and so forth. Rules for digitizing PUF bits utilizing differential operations on multiple memory cells can be stored in trim instructions 122, in an embodiment or elsewhere in controller 120 or integrated circuit device 100.

Embodiments of the present disclosure provide improved differential programming of multiple resistive switching memory cells that define a PUF bit. In one aspect of such embodiments, controller 120 can include a detection circuit to detect a program event(s) for a first of the multiple resistive switching memory cells (or a first group of such cells). Additionally, controller 120 can include a termination circuit configured to disconnect the multiple resistive switching memory cells from program voltage in response to detection of the program event(s). This disconnection from program voltage can occur prior to completion of a program cycle associated with the differential programming, as an example. In at least some embodiments, controller 120 (or array(s) 110 itself) can include a common node connected to second terminals of the multiple resistive switching memory cells for the differential programming to facilitate intrinsic suppression of the second of the multiple resistive switching memory cells (or the second group of such cells) in response to the program event. The intrinsic suppression of un-programmed memory cells can be very rapid (e.g., less than 10 nanoseconds, ns), greatly mitigating unexpected program events for the differential programming of the PUF bit.

In yet other embodiments, controller 120 can be operable to selectively implement one-time programmable operations on selected PUF bits to render permanent a PUF bit sequence generated with a program event at a set of PUF bits (or, e.g., stored at a set of memory cells in response to generation at other memory cells by a non-program event, such as native leak current or the like). Described differently, a PUF data sequence comprising program and un-programmed bits can be reinforced with a strong program pulse, e.g., a one-time programmable pulse, to make program bits of the PUF data sequence non-erasable and create large sensing margin between the program bits and the un-programmed bits of the PUF data sequence. This can serve to greatly enhance longevity and accurate read cycle counts of the PUF bit sequence.

In still additional embodiments, controller 120 can be operable to establish one or more threshold metric levels (e.g., current level(s), resistance level(s), program voltage level(s), program speed level(s), etc.) for defining PUF bit values (e.g., logic levels; a '0' bit and a '1' bit in the binary context) from sensing operations or program operations performed on PUF cells 116, as described herein. As an illustrative example, if an operational characteristic selected to generate identifier bit data is a native leak current, a current value threshold (or small range of values) (e.g., 500 nA, or any other suitable value or range) can be selected and resistive switching devices above the current value threshold can be allocated a '1' identifier bit value and devices below the current value threshold can be allocated a '0' identifier bit value. In other embodiments, a range of threshold values with a lower threshold and an upper threshold (e.g., a lower threshold of 400 nA and an upper threshold of 600 nA, or any other suitable threshold value or range of values) can be utilized. Devices with native current below 400 nA can be allocated a 'O' identifier bit value; devices with native current above 600 nA can be allocated a '1' identifier bit value, and devices between 400 nA and 600 nA can be discarded, in an embodiment. In an embodiment, further read operations can use a 500 nA threshold to regenerate the '0' bit values and '1' bit values. Using lower and higher initial threshold values can increase sensing margin and reduce bit error rates, according to embodiments of the present disclosure.

It should be appreciated that a suitable threshold or set of thresholds can be established for other resistive switching device operational characteristics selected for generating PUF bit values. As another (non-limited) illustrative example, a logic level 0 can be associated with a program voltage of 2 volts or higher and a logic level 1 associated with a program voltage of 1.8 volts or below. As stated previously, other suitable thresholds can be used to define logic level values for PUF bits as disclosed herein. In some embodiments, when a large number of resistive switching devices are sensed as part of generating PUF bits, a threshold voltage, current, pulse width etc., can be selected such that approximately half of the devices become associated with a logic level 0 and another half become associated with a logic level 1. In some embodiments, threshold settings can be performed manually by way of controller 120; in other embodiments default threshold settings can be set (optionally stored in trim instructions 122) upon initializing a semiconductor chip.

In addition to the foregoing, controller 120 can be configured to define an arrangement or ordering of resistive switching devices (or groups of resistive switching devices) to create a multi-bit sequence of identifier bits. As one illustrative example, resistive switching devices 0:7 can be read and assigned to bits 0:7 of a bit sequence. In an alternative embodiment utilizing pairs of switching devices to a define an identifier bit-first resistive switching devices 0:7 in a block of array(s) 110 can be associated with second resistive switching devices (n: n+8) elsewhere in the block of the array(s) 110 (or in another block of the array(s) 110) by controller 120 to define identifier bits 0:7 of a (differential) bit sequence. The variable: n can be any suitable number greater than 7 if in the same block, or any number if in a different block or on a different wordline of the block. However, in particular embodiments the number n can be a multiple of the size of the bit sequence, e.g., for an 8-bit identifier sequence a multiple of n=8:8, 16, 24, 32, . . . , 128, 256, 512, and so forth. In other embodiments, the bit sequence need not be derived from resistive switching devices arrayed in a particular order (consecutive or otherwise). As an example, from an ordinal line of resistive switching devices, devices 15, 90, 7, 21, 50, 2, 37, 19 (and suitable associated groups of other resistive switching devices in the differential programming context, where multiple resistive switching devices define each PUF bit) can be read and respectively assigned to bits 0:7 of an output bit string. The bit string can be of any selected length, defined by a matching number of resistive switching devices (or multiples of the matching number in the differential context). For instance, bit strings of 64 bits, 256 bits, 1024 bits, 64 kbits, or any other suitable subset of PUF cells 116 up to all of PUF cells 116 (which can include all of array(s) 110 of memory in at least some embodiments) may be employed for a bit string. As another non-limiting illustration, for a 256-bit PUF data sequence utilized for a cryptographic key, controller 120 can characterize a set of memory cells as PUF bits and define an ordering of resistive switching memory cells assigned to the PUF bits to correspond with a sequence of 256 bits. Bit values (e.g., logic levels, . . . ) generated from the assigned resistive switching memory cells can then be ordered by controller 120 consistent with the device(s) ordering to thereby create the 256-bit identifier sequence. As a specific illustration: where a row of 256 resistive switching devices in an array is selected for generating an identifier sequence, identifier bit values of the 256 resistive switching devices can be arranged in the order the resistive switching devices are physically situated in the row; however, this is an illustrative example only and any other suitable arrangement or ordering can be implemented by controller 120 as an alternative or in addition.

In should be understood that operations, configurations, characteristics and various illustrations and descriptions of controller 120 can be applicable to other controllers disclosed herein in various embodiments (e.g., with reference to FIG. 11, infra, memory array 1102 and components of operating environment 1100 configured for control of operations of memory array 1102). Conversely, operations, configurations, characteristics and various illustrations and descriptions of other controllers disclosed herein can be applicable to controller 120 in one or more embodiments.

Trim instructions 122 can comprise rules for characterizing one or more groups of resistive switching devices of array(s) 110 as PUF cells 116, rules for defining multiple resistive switching cells 116 to form differential PUF bits in some embodiments (e.g., see FIG. 4, infra), rules for performing a PUF operation such as a PUF write (to generate PUF bits) or a PUF read (to read data generated with a PUF write and stored at cells generating the data, stored at a portion of the cells generating the data, or stored at other cells within array(s) of memory 110, according to various embodiments), and rules for re-characterizing resistive switching devices as OTP cells 114 or MTP cells 112 previously characterized as PUF cells 116, or as no characterization. Trim instructions 122 can likewise store rules for characterizing one or more groups of resistive switching devices as OTP cells 114 or MTP cells 112, rules for performing an OTP or MTP operation, and rules for re-characterizing OTP cells 114 or MTP cells 116 as other characterizations (where suitable), or no characterization (e.g., utilizing default or conventional trim instructions in at least one embodiment).

To implement operations on memory cells consistent with a previous characterization, controller 120 can reference saved characterizations for groups of memory cells (e.g., stored in trim instructions 122 or elsewhere on integrated circuit device 100, such as within array(s) 110 itself) and obtain from trim instructions 122 suitable signal characteristics for a memory operation consistent with the characterization. Suitable signal characteristics can include: a voltage magnitude(s), current compliance, signal duration, dynamic voltage pulse as a function of time, and so forth. For a PUF write, for instance, trim instructions 122 can store suitable signal characteristics for various PUF write modalities described herein (e.g., utilizing native current, native electrical resistance, detected program event(s), among others). Trim instructions 122 can also store suitable inhibition signals for memory cells neighboring a cell(s) being operated upon, a termination condition(s) for terminating an operation signal, among other signal operations employed for implementing memory operations or PUF operations on resistive switching devices as known in the art or described herein. Likewise, trim instructions 122 can store suitable signal characteristics, inhibit signal characteristics, termination conditions, and so forth, for other disclosed PUF bit sensing operations. Further, trim instructions 122 can store rules for aggregating multiple memory cells to form a differential PUF bit, for differential PUF memory operation, and for aggregating groups of multiple memory cells to create multiple differential PUF bits to generate a sequence of PUF data. Other operational rules, configurations, settings and the like can be stored in trim instructions 122 as disclosed herein, as known in the art or as reasonably conveyed to one of ordinary skill in the art by way of the context disclosed herein. For instance, trim instructions 122 can specify a subset of multiple memory cells defining a PUF bit (e.g., one memory cell of a pair of memory cells defining the PUF bit; two memory cells of four memory cells defining the PUF bit, etc.) as storing a data value for the PUF bit generated in response to a differential program protocol.

Also illustrated in integrated circuit device 100 is an input(s) 140 and output(s) 150. In some embodiments, input(s) 140 can include (or provide a pathway for) data to be stored within array(s) 110 of two-terminal resistive-switching memory cells, such as MTP cells 112 or OTP cells 114. Output(s) 150 can output data stored within resistive switching devices of array(s) 110, including PUF cells 116 as well as OTP cells 114 and MTP cells 112. In some embodiments, output(s) 150 can output data that results from computations utilizing data stored in PUF cells 116 or stored within MTP cells 112 or OTP cells 114 resulting from such computations, in further embodiments.

A command/data interface 130 is provided to receive memory commands from an external device and respond to those commands. Further, data to be written to array(s) 110 can be received by way of command/data interface 130, and data output from array(s) 110 can be provided over command/data interface 130. In at least some embodiments, controller 120 can dynamically expose selection, operation or (re-)characterization of memory cells of array(s) 110 to an external host device (separate from integrated circuit device 100—not depicted) by way of command/data interface 130. In various example implementations, the external host device can be manufactured separately and communicatively interconnected by one or more network or device interfaces to command/data interface 130 to accomplish this embodiment(s).

As introduced previously, disclosed resistive switching devices have excellent properties for generating identifier data sequences. Such properties include high entropy, which is suitable for generating random or substantially random numbers, low bit error rate (BER), inherent difficulty in reverse engineering or illicit side-channel data access, and fast sensing times. For example, a bit sequence of 128 or 256 identifier (e.g., PUF) bits can be formed from 128 or 256 resistive switching devices or 128/256 groups (e.g., pairs, etc.) of multiple such resistive switching devices (as described in differential identifier bit generation; see FIG. 2 infra). High randomness in generating identifier bits minimizes non-random patterns between bits (resistive switching devices/groups of such devices) of a sequence, mitigating or avoiding false rejection rates.

FIG. 2 illustrates a block diagram of an example electronic device 200 configured for supply chain validation, according to various embodiments of the present disclosure. In some aspects of the disclosed embodiments, electronic device 200 can embody a digital hard wallet for a cryptocurrency(ies), a secure peer device of a peer network for validating elements of a blockchain, or the like. In addition to the foregoing, electronic device 200 is not limited to package-level supply chain authentication, but provides circuit-level and even device-level authentication for components and sub-components of electronic device 200.

As introduced previously, authentication particular only to a single die (die-level authentication) or to a single IC package or IC product to which multiple dies are operably bonded (package-level or product-level authentication) can leave vulnerabilities open within a supply chain between a trusted manufacturer and an end user. One example vulnerability is referred to as a man-in-the-middle attack. In this type of hacking attack, a person why has access to a die or IC package following the trusted manufacturer (but before the end user) could replace a component of the die/package-whether software, hardware or both—with a compromised component. When the end user receives the die or IC package the authentication specific to the die/package will often properly authenticate, implying the die/package is secure and will operate as intended by the trusted manufacturer. Instead, the compromised component can create a hacking vulnerability that allows data theft, identity theft, or in the case of a digital hard wallet, theft of cryptocurrencies.

Electronic device 200 can mitigate or avoid supply chain vulnerabilities by providing authentication for device-level or circuit-level components of electronic device 200. Accordingly, a compromised component can be detected upon authentication (e.g., see FIG. 6, infra).

Electronic device 200 can comprise a memory control unit 210 in one or more embodiments. Memory control unit 210 can be substantially similar to controller 120 in one or more disclosed embodiments, having some or all characteristics and functionality of controller 120 as described herein. However, the subject disclosure is not so limited, and memory control unit 210 can have some of the functionality described above for controller 120 as well as other functionality of a memory controller or memory control environment (e.g., see FIG. 9, infra) described herein or known in the art, in any suitable combination.

Memory control unit 210 can comprise an embedded memory 212, including a firewall enabled 214 portion of embedded memory 212. Firewall enabled 214 memory can store a validation code associated with memory control unit 210. In addition, firewall enabled 214 memory can store a validation code associated with a manufacturer of electronic device 200 (or a manufacturer of memory control unit 210, in some embodiments).

Electronic device 200 can further comprise a resistive switching memory (ReMEM) 230 and a secure element 220. Secure element 220 can comprise an embedded memory 222 comprising a validation code associated with secure element 220. In an embodiment(s), the embedded memory 222 can be set to a no read and no write status, preventing direct access (read or write) to embedded memory 222 of secure element 220. In such embodiment(s), any authentication of the validation code of secure element 220 is processed internally within secure element 220 (e.g., by embedded logic or processing circuitry within secure element 220—not depicted) and an output of the authentication, either: valid or not valid is output by secure element 220 (e.g., to memory control unit 210). In such embodiments, the embedded logic can prevent access to the validation code of secure element 220 to any element external to secure element 220, including resistive switching memory 230 and memory control unit 210. Instead, the embedded logic receives an authentication request and authentication data (e.g., data representing a key paired with the validation code of secure element 220) and outputs a result of the authentication.

Resistive switching memory 230 can comprise a validation code associated with resistive switching memory 230 and stored in a first subset of resistive switching memory 230. In at least some embodiments, the validation code can be generated from PUF cells 116 and stored as a PUF data sequence in the first subset of resistive switching memory 230. Resistive switching memory 230 can further comprise a digital certificate 234 stored in a second subset of resistive switching memory 230. The digital certificate 234 can comprise derivatives of the validation codes of memory control unit 210, secure element 220 and resistive switching memory 230 that are encrypted or otherwise secured by the validation code of the manufacturer of electronic device 200 (or of memory control unit 210, in at least one embodiment).

According to an aspect of the disclosed embodiments, validation codes for electronic device 200, components thereof and a manufacturer(s) can be public-private key pairs. In such case, embedded memory 212 of memory control unit 210 can comprise a public key 216 of a trusted manufacturer (e.g., a manufacturer of electronic device 200 or of memory control unit 210, of resistive switching memory 230 or of secure element 22, or a manufacturer of a suitable combination of the foregoing) and a private key 218 of memory control unit 210. Private key 218 can be part of a public-private key pair generated by a trusted manufacturer upon validation of memory control unit 210 and stored in a portion of embedded memory 212 (optionally along with associated data utilized in cryptographic identification, cryptographic hashing, cryptographic authentication, or like processes or algorithms) that is non-erasable and non-writable. This portion of embedded memory 212 can be firewall enabled 214 memory. Firewall enabled 214 memory can be Flash memory, SRAM memory, DRAM memory, or other suitable floating gate memory, that is internally locked from erase, overwrite or otherwise changing. In other embodiments, firewall enabled 214 memory can be a one-time programmable memory. Public key 216 of the trusted manufacturer can be saved to embedded memory 212 and locked from being changed (or made one-time programmable) by the trusted manufacturer of memory control unit 210.

In the foregoing embodiments, secure element 220 can also have a private key 224 of a public-private key pair generated for secure element 220 stored in embedded memory 222. Likewise, resistive switching memory 230 can have a private key 232 of a public-private key pair generated for resistive switching memory 230 stored in the first subset of resistive switching memory 230. In at least one aspect of these embodiments, one or more of the public-private key pair of memory control unit 210 (and thus private key 218), the public-private key pair of secure element 220 (and thus private key 224) or the public-private key pair of resistive switching memory 230 (and thus private key 232) can be generated from a PUF process utilizing PUF cells (e.g., as described with respect to PUF cells 116 of FIG. 1, infra) of resistive switching memory 230. PUF cells from which private key 232 are generated can continue to store private key 232 (and thus embody the first subset of resistive switching memory cells of resistive switching memory 230 in which private key 232 is stored). Private key 218 can be stored in firewall enabled 214 memory of embedded memory 212 once generated in PUF cells of resistive switching memory 230 in such aspects, and similarly private key 224 can be stored in embedded memory 222 of secure element 220 once generate in other PUF cells of resistive switching memory 230.

Further to such embodiments, digital certificate 234 can comprise public keys of the public-private key pairs of memory control unit 210, secure element 220 and resistive switching memory 230. In general, digital certificate 234 and public keys included therein, as well as digitally signed information (see below), can be stored in a second subset of resistive switching memory cells of resistive switching memory 230. The second subset of resistive switching memory cells can be MTP cells (e.g., MTP cells 112) or OTP cells (e.g., OTP cells 114) or at least in part can even be PUF cells (e.g., PUF cells 116) where public-private key pairs are generated from the PUF cells of resistive switching memory 230, and the public key portions of the public-private key pairs are retained in PUF cells from which they were generated. For instance, a ReMEM public key 236A of a public-private key pair generated for resistive switching memory 230 can be stored with digital certificate 234, a MCU public key 236B of a public-private key pair generated for memory control unit 210 can be stored with digital certificate 234, and a SE public key 236C of a public-private key pair generated for secure element 220 can be stored with digital certificate 234. The ReMEM public key 236A, MCU public key 236B and SE public key 236C are referred to hereinafter collectively as public keys 236A-C.

In addition to public keys 236A-C, digital certificate 234 can store information pertaining to the public keys 236A-C. Such information can be a date (e.g., of generation, or of manufacture or of testing/validation of a component-electronic device 200, memory control unit 210, secure element 220, or resistive switching memory 230—associated with the public-private key pair), an owner or manufacturer entity name, a hash algorithm(s) used in digitally signing the public key and information, or like information. Further, a digitally signed digest 238 of public keys 236A-C can be stored at digital certificate 234, which can be encrypted by a private key of the trusted manufacturer. Such private key can be a public-private key pair of public key 216, in an embodiment(s).

In an embodiment(s), digitally signed digest 238 can be generated by hashing one or more of public keys 236A-C, optionally together with the information pertaining to public keys 236A-C. A result of the hash is a hash digest. As an example, of a SHA256 hash algorithm is utilized to hash public keys 236A-C (and optionally the associated information), a 256 bit long hash digest is produced. The hash digest is then encrypted by the private key of an entity that endorses digital certificate 234. In some aspects of the disclosed embodiments, the private key (and entity that endorses digital certificate 234) can be that of the trusted manufacturer, although the subject disclosure is not limited to these aspects. A result of the encryption of the hash digest with the private key is a digitally signed digest 238. In other embodiments, a different process can be utilized to generate digitally signed digest 238 from public keys 236A-C and optionally the information associated therewith.

By saving ReMEM private key 232 in resistive switching memory 230 and saving digital certificate 234 in resistive switching memory 230, electronic device 200 can mitigate or avoid many attempts at hacking and compromising such validation codes. For instance, transmission electron microscopy (TEM) side-channel attacks against storage devices containing validation codes can be thwarted or severely hampered by resistive switching memory 230 (e.g., see FIGS. 3A and 3B, infra). In addition, where embodiments of the present disclosure store private key 232 or digital certificate 234 at least in part within differential PUF bits consisting of multiple resistive switching memory cells, power-consumption side-channel attacks can also be thwarted (e.g., see FIG. 4, infra). Still further, where resistive switching memory 230 is formed among metal layers of electronic device 200 (e.g., among back-end-of-line metal layers, or other metal layers), laser imaging side-channel attacks can be thwarted or significantly mitigated (e.g., see FIG. 5, infra). Moreover, by maintaining public keys 236A-C in a digital certificate 234 stored in resistive switching memory, validation codes specific to individual components of electronic device 200, including memory control unit 210, secure element 220 and resistive switching memory 230, can be preserved for circuit-level or device-level authentication to mitigate or avoid man-in-the-middle type compromise efforts. This provides for more thorough and robust authentication of electronic device 200 and all of its components and sub-components. Although not specifically depicted, it should be understood that other components or sub-components of electronic device 200 not specifically depicted can be associated with a validation code that can be stored (or partially stored, in the public-private key pair embodiments) in digital certificate 234 for additional circuit-level and device-level authentication, including fixed logic devices, programmable logic devices, memory(ies), memory structures, processors, logic arrays, and the like, and suitable combinations of the foregoing.

Figure 3A:
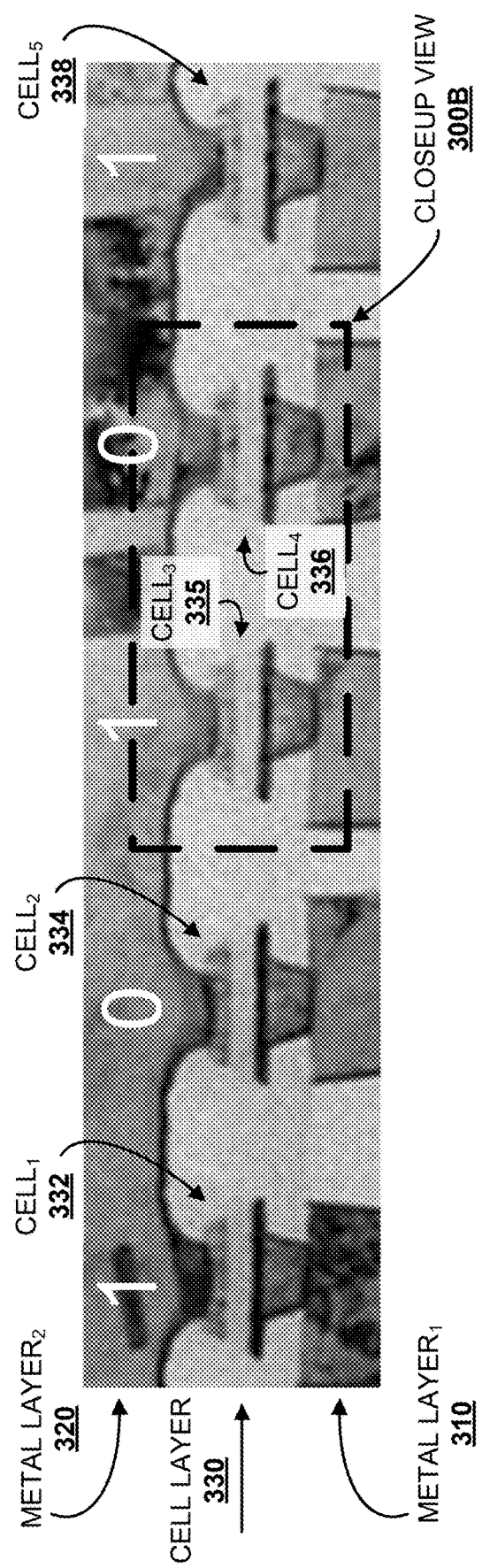
FIG. 3A provides an image of an example transmission electron microscope (TEM) image of resistive switching memory cells having different binary resistance states.

FIG. 3A depicts a TEM scan 300 of an array of resistive switching devices according to further embodiments of the present disclosure. In various embodiments, the array of resistive switching devices can comprise atomic-scale filamentary resistive switching memory cells. Such memory cells can comprise a conductive filament in which position of a few atoms, ions or atomic particles at a boundary of a switching layer and adjacent electrode determine continuity or non-continuity of the conductive filament through the switching layer.

TEM scan 300 illustrates five adjacent two-terminal resistive switching memory cells. The memory cells are positioned within a cell layer 330 between a first metal layer: metal layer$_1$ 310 and a second metal layer: metal layer$_2$ 320 (referred to hereinafter collectively as: metal layers 310-320). Metal layers 310-320 can be back-end-of-line metal layers in some disclosed embodiments (e.g., see FIG. 5, infra) though the subject disclosure is not so limited. As shown, the two-terminal resistive switching memory cells include a first cell: cell$_1$ 332, a second cell: cell$_2$ 334, a third cell: cell$_3$ 335, a fourth cell: cell$_4$ 336 and a fifth cell: cell$_5$ 338 (referred to hereinafter collectively as cells 332-338). Each of cells 332-338 are labeled with a resistive switching state denoted by a '1' or a '0' overlying metal layer$_2$ 320 adjacent respective ones of cells 332-338. Cell$_3$ 335 and cell$_4$ 336 are included in closeup view 300B in FIG. 3B.

Figure 3B:
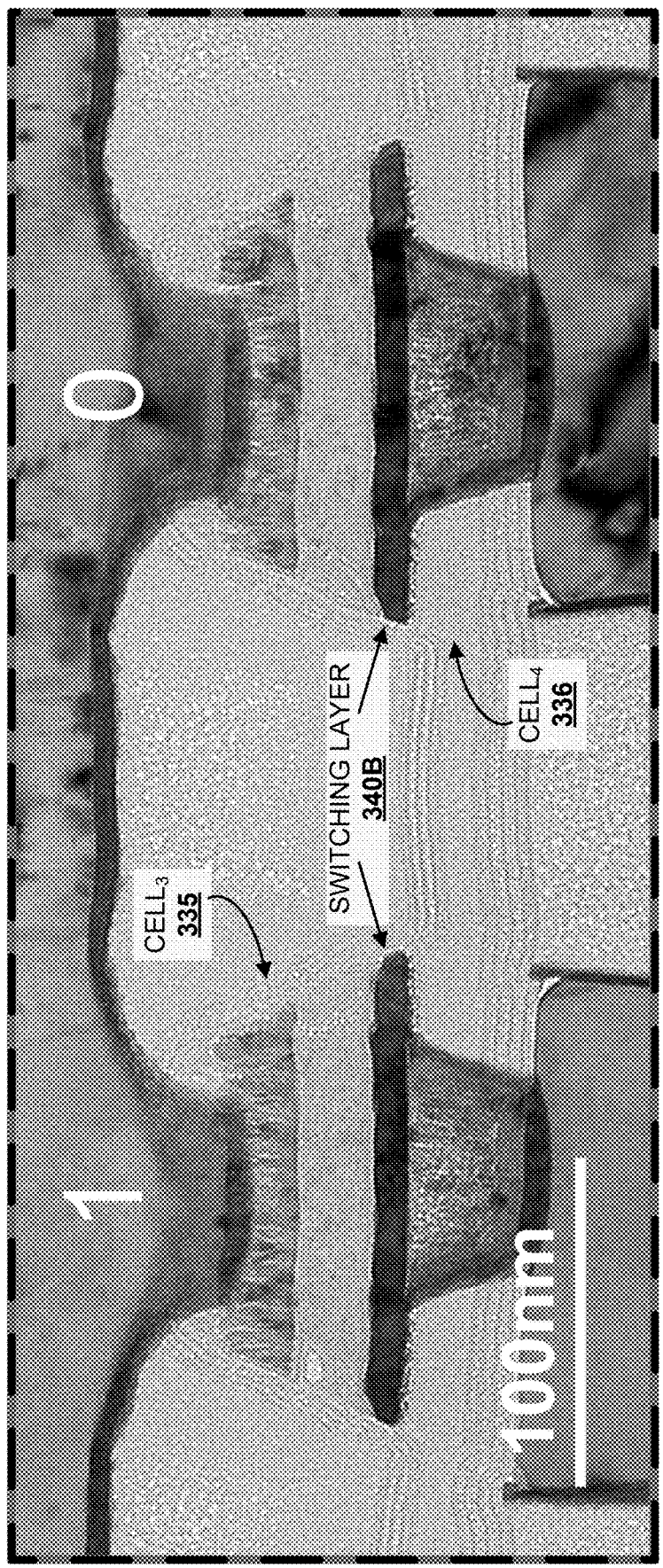
FIG. 3B is a closeup view of the TEM image of FIG. 3A of adjacent resistive memory cells having different resistive states in further embodiments.

As shown in FIG. 3B, closeup view 300B of TEM scan 300 shows switching layers 340B within cell$_3$ 335 and cell$_4$ 336. No visible distinction within switching layer 340B is evident between cell$_3$ 335 and cell$_4$ 336. Accordingly, the TEM scan 300 gives no assistance in trying to illicitly read the resistive switching states of cell$_3$ 335 and cell$_4$ 336. Resistance states of other types of memory are easily discernible by viewing a switching layer of such cell. This can be the case for phase change memory, that changes resistance state in response to a switching layer changing from a crystalline state to an amorphous state. The crystalline state is visibly distinct from the amorphous state, allowing the resistance state (and therefore the data stored therein) to be illicitly read through viewing the switching layer with TEM. In contrast, atomic scale filamentary ReMEM give little to no visible distinction of resistance state. This can be particularly so for switching layers composed of the same or similar material as the ion donor active metal layer. For instance, where switching layer 540B is a first metal, or metal compound of a first stoichiometry (e.g., $MN_x$ or $MO_x$, where M is a metal and x is a relative concentration of Nitrogen or Oxygen, respectively, in the first metal compound) and the ion donor active metal layer is a second metal, or metal compound of a second stoichiometry (e.g., $MN_y$ or $MO_y$, where M is the metal and y is a second relative concentration of Nitrogen or Oxygen), presence of ions of metal M within switching layer comprised of $MN_x$ or $MO_x$ will be very difficult to discern visibly, in at least one embodiment of the present disclosure.

FIG. 4 depicts an example differential PUF bit 400 according to alternative or additional embodiments of the present disclosure. Differential PUF bit 400 is shown in a binary differential '0' state 410 on a left side of FIG. 4 and differential PUF bit 400 is shown in a binary differential '1' state 420 on a right side of FIG. 4. Differential '0' state 410 is defined by a first resistive memory cell: ReMEM cell$_1$ 412 in a '1' state and a second resistive memory cell: ReMEM cell$_2$ 414 in a '0' state. Conversely, differential '1' state 420 is defined by ReMEM cell$_2$ 414 in the '1' state and ReMEM cell$_1$ 412 in the '0' state. When reading the differential '1' or '0' state of differential PUF bit 400, power consumption is the same or substantially the same. Thus, read power consumption for '0' state 424 is equal to or substantially equal to read power consumption for '1' state 426. By having (substantially) the same read power consumption, differential PUF bit 400 can frustrate illicit attempts to read data stored therein by a read power consumption side-channel attack.

Figure 5:
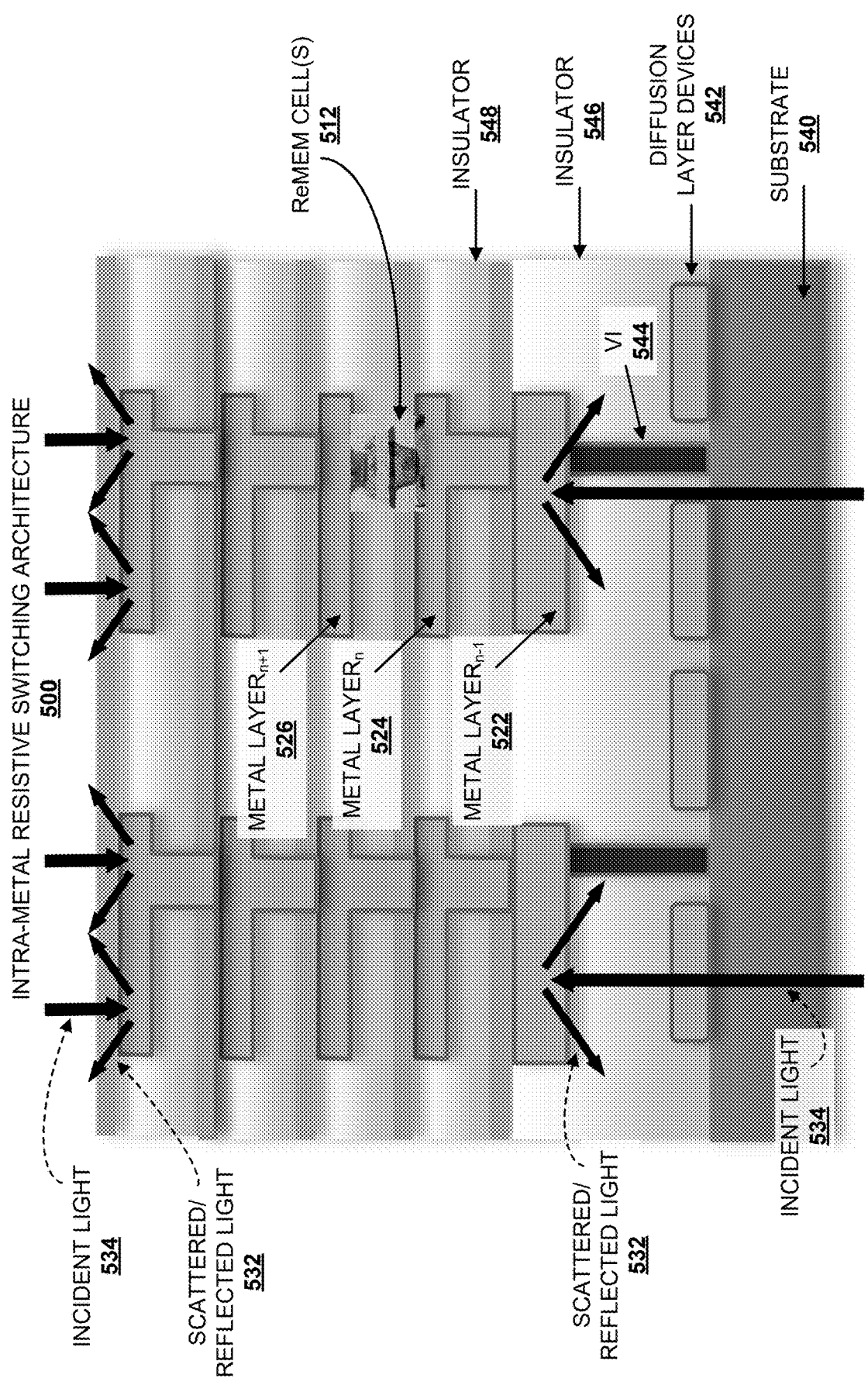
FIG. 5 depicts an integrated circuit architecture comprising resistive switching memory among metal layers of the integrated circuit architecture.

FIG. 5 is an illustration of an intra-metal resistive switching architecture 500 according to one or more further embodiments of the present disclosure. Architecture 500 shows a substrate 540 upon which front-end-of-line and back-end-of-line structures can be constructed. Front-end-of-line structures can include diffusion layer devices 542, such as transistors, logic gate devices, capacitor devices, inductor devices, and so forth. Front-end-of-line structures include vertical interconnects (VI) 544 formed within insulator 546 and, in various embodiments, one or more metal layers, such as a N–1$^{th}$ metal layer: metal layer$_{N-1}$ 522.

Back-end-of-line structures include metal layers and insulator layers 548 between respective metal layers. The back-end-of-line metal layers can include metal layer$_N$ 524, metal layer$_{N+1}$ 526 and subsequent metal layers. As is shown, one or more ReMEM cells 512 can be constructed between metal layers of architecture 500. In various embodiments, the ReMEM cells 512 can be positioned between front-end-of-line metal layers or between back-end-of-line metal layers.

Metal layers 522, 524, 526 are opaque to many spectra of light. For instance, incident light 534 directed into substrate 540 comprising silicon or silicon germanium material can allow the light to transmit fairly readily therein. However, incident light 534 is absorbed, reflected or scattered (but not transmitted) by metal layers 522, 524, 526. Thus, laser scanning attempts to view or otherwise scan ReMEM cells 512 to illicitly determine the data values stored therein can be mitigated or avoided by positioning ReMEM cells 512 between metal layers, similar to that shown in FIG. 5.

Figure 6:
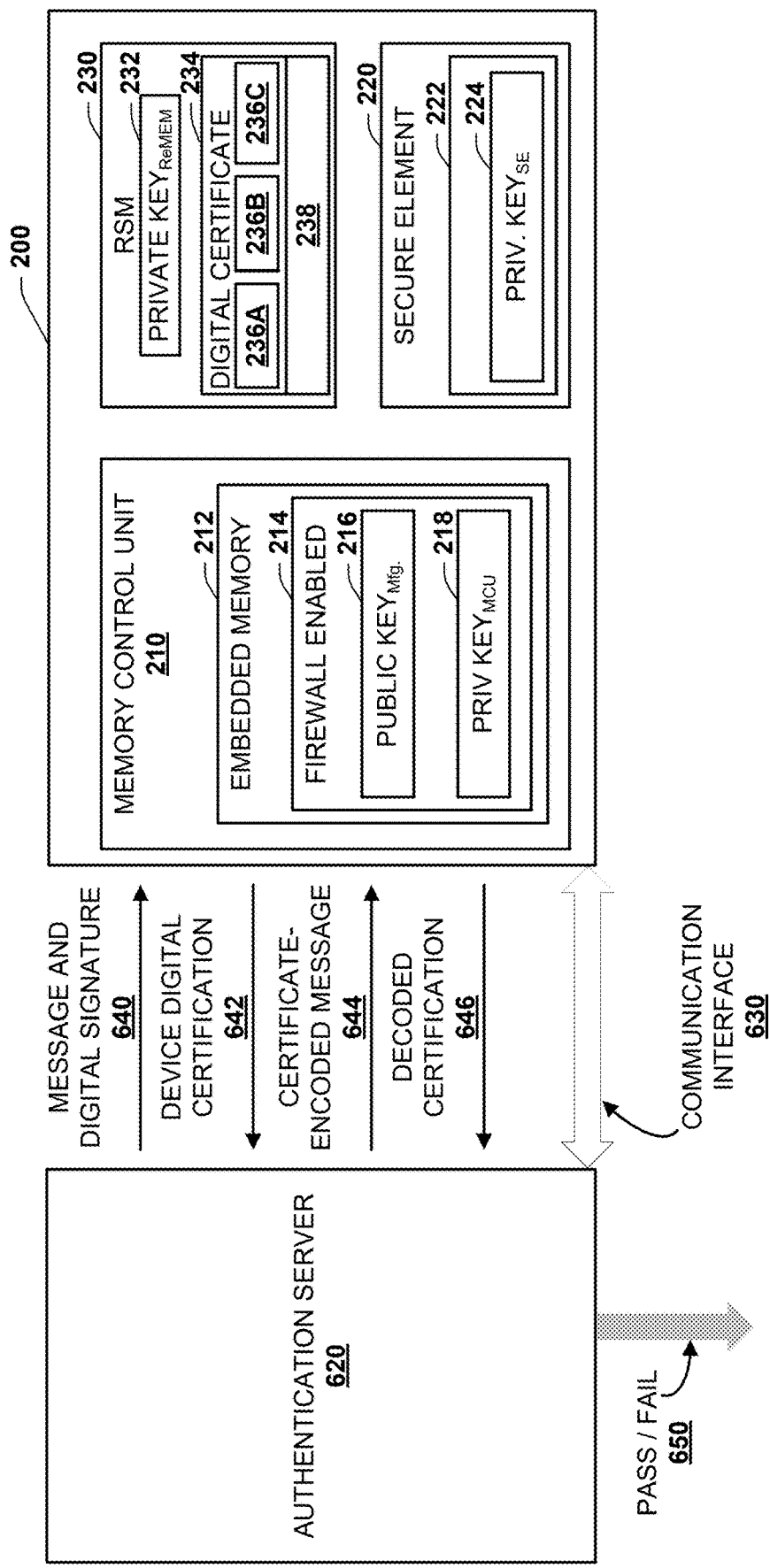
FIG. 6 depicts a block diagram of an example system for supply chain validation of an electronic device and components thereof in other embodiments.

FIG. 6 shows an example supply chain authentication system 600 according to alternative or additional embodiments of the present disclosure. Supply chain authentication system 600 can include electronic device 200 and an authentication server 620 associated with a trusted manufacturer of electronic device 200 (or a component or sub-component of electronic device 200). Electronic device 200 can exchange information with authentication server 620 by way of a communication interface 630. In some embodiments, communication interface can be a network interface, including one or more wired or wireless communication networks, or can be a data exchange interface, such as a code generation output and input mechanism at electronic device 200 and authentication server 620. As an example, the code generation output and input mechanism can include a QR code generation application and display or transfer interface (e.g., a display screen at which a QR code can be displayed, or a network over which the QR code can be transmitted) and QR code reader and processing application (e.g., a camera for capturing an image of the QR code and application for processing the QR code, or a network receiver for receiving data indicative of the QR code and a data processor for extracting and interpreting data included in the QR code).

Authentication system 600 can be configured to authenticate electronic device 200 and components thereof at authentication server 620, and vice versa. Specifically, electronic device 200 (or a user thereof, in an embodiment) can request authentication at authentication server 620. Authentication server 620 can output a message and digital signature 640 (e.g., by QR code, or other mechanism) to electronic device 200. The message and digital signature 640 can be digitally signed by a private key associated with a trust manufacturer of electronic device 200 or a component thereof. Upon receiving message and digital signature 640 at electronic device 200, memory control unit 210 can utilize a public key 216 of the trusted manufacturer to decrypt the digital signature and extract a message therefrom. If the extracted message matches the message provided with message and digital signature 640, memory control unit 210 can validate authentication server 620 as having private key paired to public key 26 of the trusted manufacturer. Otherwise, electronic device 200 can output a failed authentication for message and digital signature 640.

Upon successful validation of message and digital signature 640, electronic device 200 can provide digital certificate 234 in a device digital certificate message 642. Device digital certificate message 642 can be transmitted to authentication server 620 over a network, or can be included in a QR code, or other suitable mechanism. Authentication server 620 can decrypt digitally signed digest 238, which was encrypted with the private key of the trusted manufacturer as described above at FIG. 2, supra. Upon successful decryption, authentication server 620 extracts ReMEM public key 236A, MCU public key 236B and SE public key 236C. Authentication server 620 can then generate three challenges (e.g., messages, or the like) and encrypt each of the challenges with respective ones of the public keys 236A-C. Encrypted challenges are included in a certificate-encoded message 644 output, transmitted or otherwise provided to electronic device. Memory control unit 210 extracts the individual challenges encrypted by the respective public keys and electronic device 200 decrypts the three challenges with respective private keys: private key 218 for the challenge encrypted with MCU public key 236B, private key 224 for the challenge encrypted with SE public key 236C, and private key 232 for the challenge encrypted with ReMEM public key 236A. In an embodiment, each component decrypts a respective challenge at such component. For example, memory control unit 210 decrypts the challenge encrypted with MCU public key 236B within memory control unit 210; secure element 220 decrypts the challenge encrypted with SE public key 236C within secure element 220; and resistive switching memory 230 decrypts the challenge encrypted with ReMEM public key 236A within resistive switching memory 230. In another embodiment, memory control unit 210 can decrypt the challenges encrypted with MCU public key 236B and with ReMEM public key 236A.

The decrypted challenges are included into a decoded certification message 646. Decoded certification message 646 is received at authentication server 620, and if the decrypted challenges match the original challenges, authentications server 620 can validate memory control unit 210, resistive switching memory 230 and secure element 220, and likewise validate electronic device 200. If at least one decrypted challenge does not match an original challenge, electronic device 200 can fail validation. A pass/fail output 650 can be generated and output by authentication server 620. If electronic device 200 fails authentication, a user can know that electronic device 200 is compromised and discard the device, attempt to investigate where the compromise occurred, or the like. In various embodiments, authentication server 620 can also output which component(s) of electronic device is compromised based on which decrypted challenge fails to match the original challenge.

The diagrams included herein are described with respect to several electronic devices, controllers, and arrays of resistive switching devices or an integrated circuit product(s) comprising multiple devices, controllers, or arrays. It should be appreciated that such diagrams can include those devices, controllers, etc., specified therein, some of the specified devices/controllers/arrays, or additional devices/controllers/arrays not explicitly depicted but known in the art or reasonably conveyed to those of skill in the art by way of the context provided herein. Components of disclosed integrated circuit devices can also be implemented as sub-components of another disclosed component (e.g., input 140 and output 150 can be sub-components of controller 120), whereas other components disclosed as sub-components can be separate components in various embodiments (e.g., PUF cells 116, OTP cells 114 and MTP cells 112 can be separate arrays as opposed to portions of array(s) 110). Further, embodiments within a particular Figure of the present specification can be applied in part or in whole to other embodiments depicted in other Figures without limitation, subject only to suitability to achieving a disclosed function or purpose as understood by one of skill in the art, and vice versa. As illustrative (and non-limiting) examples, controller 120 of FIG. 1 or memory control unit 210 of FIG. 2 can be embodied by some or all array control components of FIG. 9 (e.g., row control 904, sense amps 908, column control 906, clock source(s) 910, address register 914, reference and control signal(s) generator 918, state machine 920, input/output buffer 912, command interface 916), or resistive switching array(s) 110 can be substituted for memory array 902 of FIG. 9, or for volatile memory 1010A or non-volatile memory 1010B of FIG. 10, or suitable components of operating and control environment 900 or environment 1000 can be substituted or added to other components or integrated circuit devices disclosed herein, and so forth. Additionally, it is noted that one or more disclosed processes can be combined into a single process providing aggregate functionality. For instance, a write process can comprise a read-verify process, or vice versa, to facilitate storing data at memory or generating data within memory and reading that stored/generated data, by way of a single process. Components of the disclosed architectures can also interact with one or more other components not specifically described herein but known by those of skill in the art.

Figure 7:
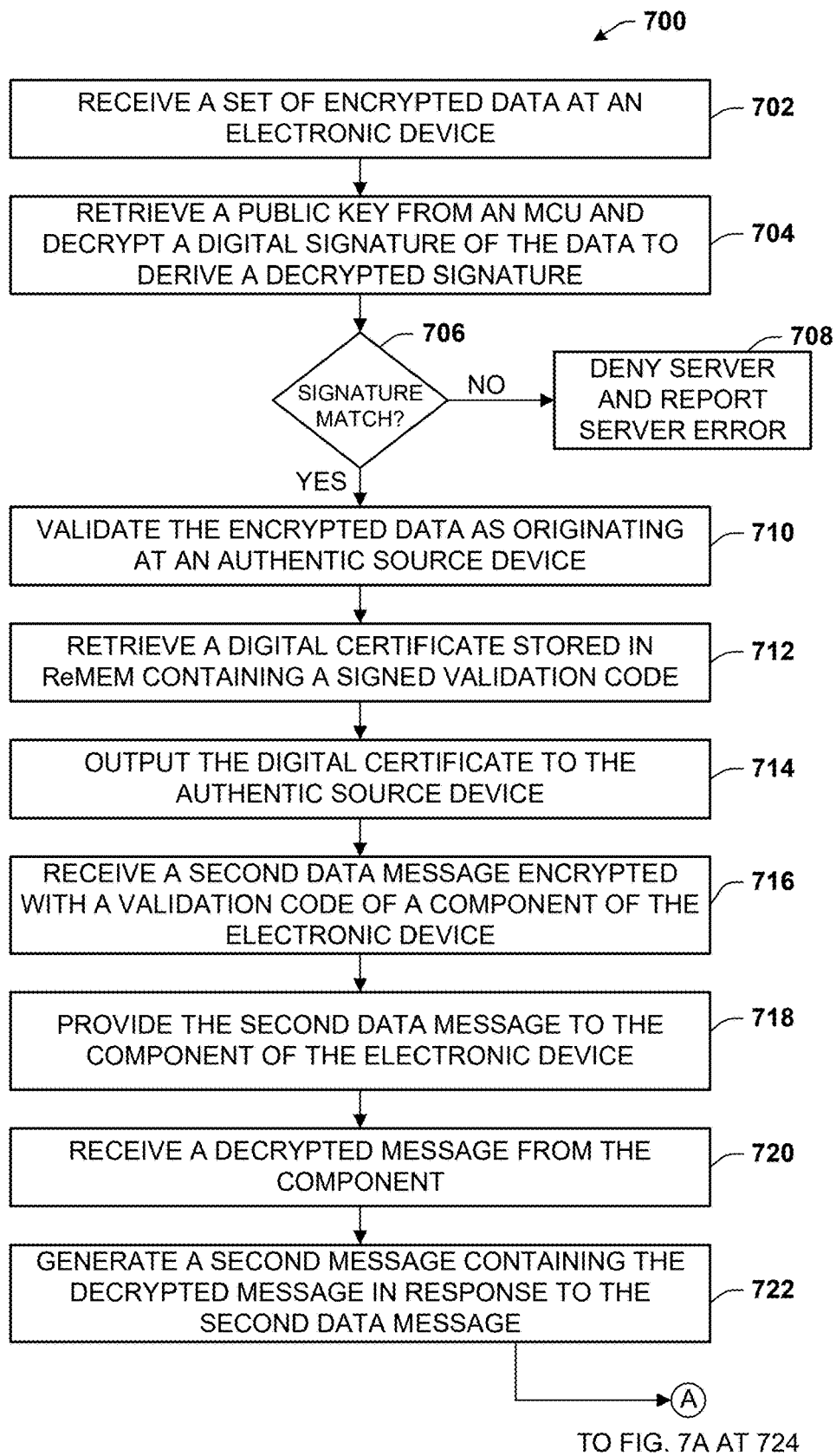
FIGS. 7 and 7A depict a flowchart of an example method for validation of components of a hard wallet device in one or more disclosed embodiments.
Figure 8:
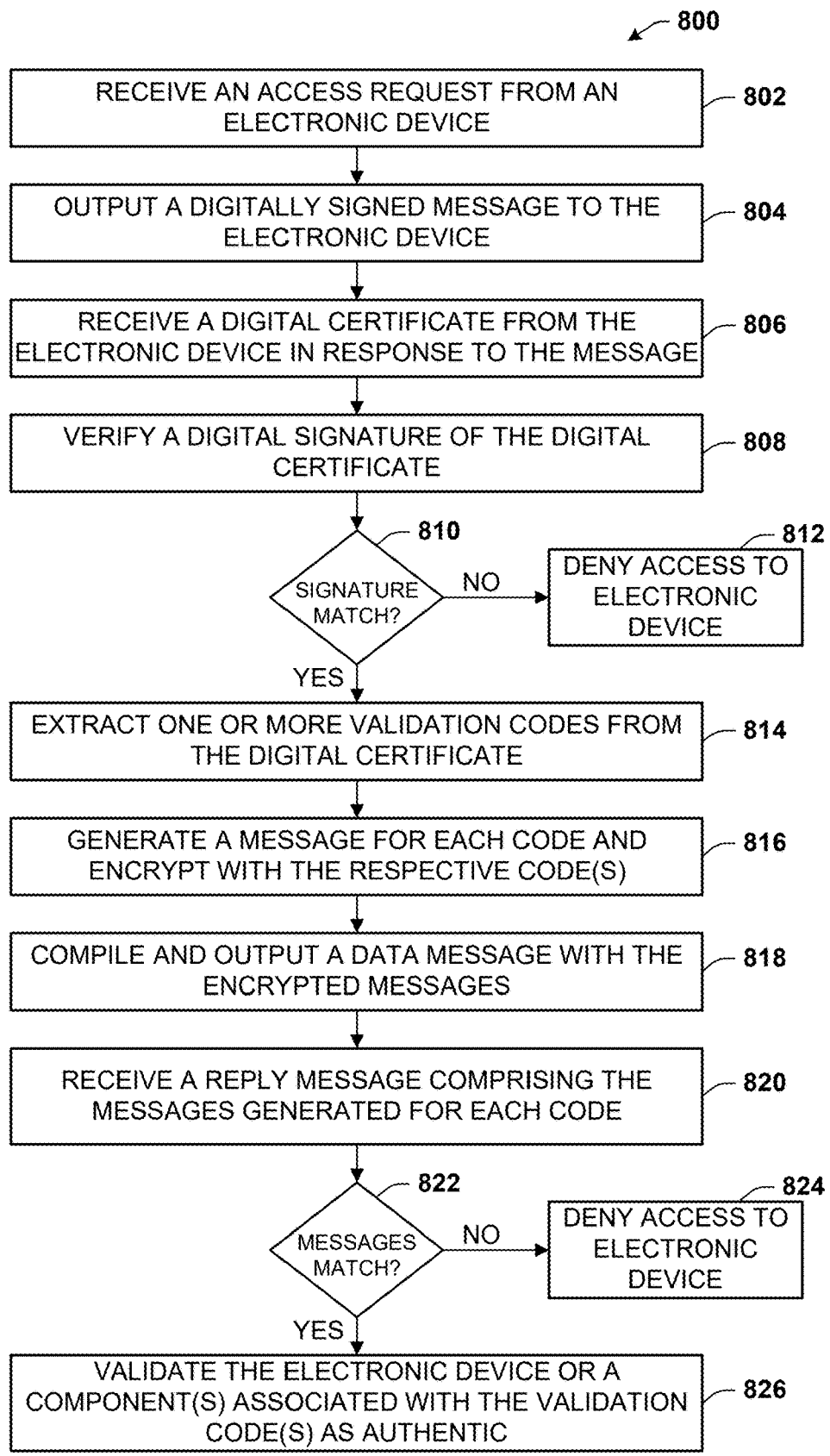
FIG. 8 depicts a flowchart of a sample method for validating an electronic device and components of the electronic device, in additional embodiments.

In view of the exemplary diagrams described supra, process methods that can be implemented in accordance with the disclosed subject matter will be better appreciated with reference to the flow charts of FIGS. 7-8. While for purposes of simplicity of explanation, the methods of FIGS. 7-8 are shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks may be required to implement the methods described herein, and in some embodiments additional steps known in the art or reasonably conveyed to one of ordinary skill in the art by way of the context provided herein can be implemented as part of a disclosed method within the scope of the present disclosure. Moreover, some steps illustrated as part of one process can be implemented for another process where suitable; other steps of one or more processes can be added or substituted in other processes disclosed herein within the scope of the present disclosure. Additionally, it should be further appreciated that the methods disclosed throughout this specification are capable of being stored on an article of manufacture to facilitate transporting and transferring such methods to an electronic device, stored in embedded memory within the electronic device, and so forth. The term article of manufacture, as used, is intended to encompass a computer program accessible from any computer-readable device, device in conjunction with a carrier, or storage medium, or the like.

Figure 7A:
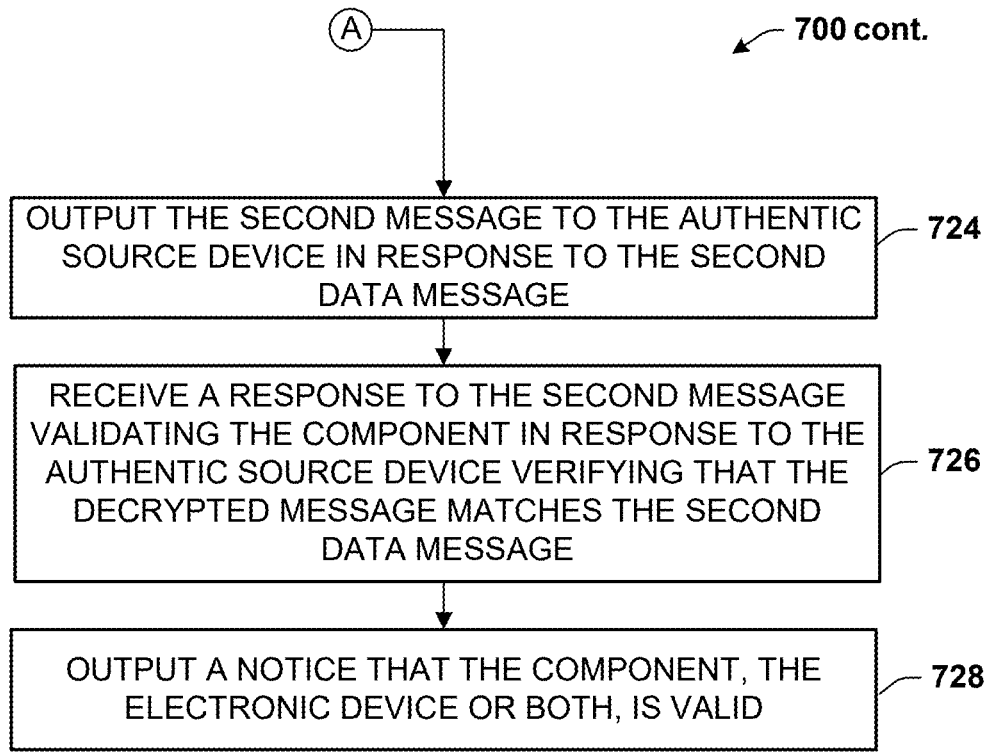

Referring to FIGS. 7 and 7A, there is depicted a method 700 for supply chain authentication of components of an electronic device according to further embodiments of the present disclosure. At 702, method 700 can comprise receiving a set of encrypted data at an electronic device. The set of encrypted data can be encrypted (e.g., digitally signed) with a private key of a trusted manufacturer. In an embodiment, the set of encrypted data can originate at a source device, such as a server, an authentication server associated with a trusted manufacturer of the electronic device or one or more components thereof.

At 704, method 700 can comprise retrieving a public key from an MCU of the electronic device and decrypt the set of encrypted data to derive a decrypted signature. In an embodiment, the public key retrieved from the MCU can be a public key of a public-private key pair associated with the trusted manufacturer. At 706, method 700 can determine whether the decrypted signature matches a message included with the set of encrypted data. If the decrypted signature does not match the message, method 700 can proceed to 708 and deny authentication of a server and report a server error.

If the decrypted signature does match the message, method 700 can proceed to 710 and can comprise validating the encrypted data as originating at an authentic source device. At 712, method 700 can comprise retrieving a digital certificate stored in a ReMEM containing a signed validation code. In an embodiment, the signed validation code can be a public key of the electronic device, or public keys of components of the electronic device (e.g., the MCU, a secure element, a memory array, a circuit-level electronic component, a device-level electronic component, or the like), optionally including information associated with the public key(s) or devices/components, signed by a private key of the trusted manufacturer. At 714, method 700 can comprise outputting the digital certificate to the authentic source device.

At 716, method 700 can further comprise receiving a second data message encrypted with a validation code extracted from the signed validation code. In an embodiment, the validation code can be a public key of one of the components of the electronic device. At 718, method 700 can comprise providing the second data message to a component of the electronic device associated with the validation code. At 720, method 700 can comprise receiving a decrypted message from the component of the electronic device and, at 722, method 700 can comprise generating a second message containing the decrypted message in response to the second data message.

Turning now to FIG. 7A, method 700 can continue from 722 at reference number 724. At 724, method 700 can comprise outputting the second message to the authentic source device in response to the second data message. At 726, method 700 can comprise receiving a response to the second message validating the component in response to the authentic source device verifying that the decrypted message matches the second data message. At 728, method 700 can comprise outputting a notice that the component, the electronic device, or both, is (are) valid.

In at least one embodiment, at least one of: the set of encrypted data, the message, the second set of encrypted data or the second message is embodied by a matrix barcode. For example, the matrix barcode can be a QR code, or the like.

In other embodiments, the component of the electronic device can be the MCU, the resistive switching memory device or a secure element embedded within the electronic device. In further embodiments, the authorized source of the component is an authorized source of the MCU, the resistive switching memory device or of the secure element. In yet other embodiments, the signed validation code can be a public key associated with the MCU, the resistive switching memory device or with the secure element that is digitally signed by a private key associated with the authorized source of the MCU, the resistive switching memory device or the secure element.

According to additional embodiments of the present disclosure, the MCU, the resistive switching memory device or the secure element can decrypt the second data message utilizing a private key associated with the public key. The private key can be stored in embedded memory of the MCU or of the secure element or in a subset of resistive switching memory cells of the resistive switching memory device.

In other embodiments, the digital certificate can further contain a second signed validation code comprising a second public key of a second component of the electronic device digitally signed with the private key associated with the authorized source. The digital certificate can also comprise a third signed validation code comprising a third public key of a third component of the electronic device digitally signed by the private key associated with the authorized source, wherein the component is the MCU, the resistive switching memory device is the second component and the secure element is the third component. In various embodiments, the second data message can be encrypted with the public key, and the second set of encrypted data can include a third data message encrypted with the second public key, the second set of encrypted data can include a fourth data message encrypted with the second public key and the second set of encrypted data can include a fourth data message encrypted with the third public key. Moreover, providing the second data message to the component can further comprise providing the second data message to the MCU of the electronic device. In such embodiments, method 700 can further comprise providing the third data message to the resistive switching memory device and receiving a second decrypted message from the resistive switching memory device, and providing the fourth data message to the secure element and receiving a third decrypted message from the secure element. In some embodiments, generating the second message can further comprise including the second decrypted message and the third decrypted message with the decrypted message as part of the second message. In additional embodiments, the response to the second message validates the MCU of the electronic device in conjunction with verifying that the decrypted message matches the second data message, validates the resistive switching memory device in conjunction with verifying that the second decrypted message matches the third data message, and validates the secure element in conjunction with verifying that the third decrypted message matches the fourth data message.

FIG. 8 depicts a flowchart of an example method 800 for authenticating an electronic device according to still further embodiments of the present disclosure. At 802, method 800 can comprise receiving an access request from an electronic device. At 804, method 800 can comprise outputting a digitally signed message to the electronic device and, at 806, method 800 can comprise receiving a digital certificate from the electronic device in response to the message. Further, at 808, method 800 can comprise verifying a digital signature of the digital certificate.

At 810, method 800 can determine whether the digital signature is properly verified. If the digital signature is verified, method 800 can proceed to 814; otherwise method 800 proceeds to 812 and can comprise denying authentication of the electronic device.

At 814, method 800 can comprise extracting one or more validation codes from the digital certificate. At 816, method 800 can comprise generating a message for each validation code and encrypting the message with the respective code(s). At 818, method 800 can comprise compiling and outputting a data message with the encrypted messages and at 820, method 800 can comprise receiving a reply message comprising the messages generated for each code.

At 822, method 800 can comprise determining whether the messages received with the reply message match the messages generated at reference number 816. If the messages do not match, method 800 can proceed to 824 and can comprise denying authentication of the electronic device. If the messages do match, method 800 can proceed to 826 and can comprise validating the electronic device or a component(s) associated with the validation code(s) as authentic.

Example Operating Environments

FIG. 9 illustrates a block diagram of an example operating and control environment 900 for a memory array 902 of a memory device according to aspects of the subject disclosure. Control environment 900 and memory array 902 can be formed within a single semiconductor die in some embodiments, although the subject disclosure is not so limited and in other embodiments some components of control environment 900 can be formed on a separate semiconductor die. In at least one aspect of the subject disclosure, memory array 902 can comprise memory selected from a variety of memory cell technologies. In at least one embodiment, memory array 902 can comprise a two-terminal memory technology, arranged in a compact two or three-dimensional architecture. Suitable two-terminal memory technologies can include resistive-switching memory, conductive-bridging memory, phase-change memory, organic memory, magneto-resistive memory, or the like, or a suitable combination of the foregoing. In a further embodiment, the two-terminal memory technology can be a two-terminal resistive switching technology.

A column controller 906 and sense amps 908 can be formed adjacent to memory array 902. Moreover, column controller 906 can be configured to activate (or identify for activation) a subset of bit lines of memory array 902. Column controller 906 can utilize a control signal(s) provided by a reference and control signal generator(s) 918 to activate, as well as operate upon, respective ones of the subset of bitlines, applying suitable program, erase or read voltages to those bitlines. Non-activated bitlines can be kept at an inhibit voltage (also applied by reference and control signal generator(s) 918), to mitigate or avoid bit-disturb effects on these non-activated bitlines.

In addition, operating and control environment 900 can comprise a row controller 904. Row controller 904 can be formed adjacent to and electrically connected with word lines of memory array 902. Also utilizing control signals of reference and control signal generator(s) 918, row controller 904 can select one or more rows of memory cells with a suitable selection voltage. Moreover, row controller 904 can facilitate program, erase or read operations by applying suitable voltages at selected word lines.

Sense amps 908 can read data from, or write data to, the activated memory cells of memory array 902, which are selected by column control 906 and row control 904. Data read out from memory array 902 can be provided to an input/output buffer 912. Likewise, data to be written to memory array 902 can be received from the input/output buffer 912 and written to the activated memory cells of memory array 902.

A clock source(s) 910 can provide respective clock pulses to facilitate timing for read, write, and program operations of row controller 904 and column controller 906. Clock source(s) 910 can further facilitate selection of word lines or bit lines in response to external or internal commands received by operating and control environment 900. Input/output buffer 912 can comprise a command and address input, as well as a bidirectional data input and output. Instructions are provided over the command and address input, and the data to be written to memory array 902 as well as data read from memory array 902 is conveyed on the bidirectional data input and output, facilitating connection to an external host apparatus, such as a computer or other processing device (not depicted, but see e.g., computer 1002 of FIG. 10, infra).

Input/output buffer 912 can be configured to receive write data, receive an erase instruction, receive a status or maintenance instruction, output readout data, output status information, and receive address data and command data, as well as address data for respective instructions. Address data can be transferred to row controller 904 and column controller 906 by an address register 914. In addition, input data is transmitted to memory array 902 via signal input lines between sense amps 908 and input/output buffer 912, and output data is received from memory array 902 via signal output lines from sense amps 908 to input/output buffer 912. Input data can be received from the host apparatus, and output data can be delivered to the host apparatus via the I/O bus.

Commands received from the host apparatus can be provided to a command interface 916. Command interface 916 can be configured to receive external control signals from the host apparatus and determine whether data input to the input/output buffer 912 is write data, a command, or an address. Input commands can be transferred to a state machine 920.

State machine 920 can be configured to manage programming and reprogramming of memory array 902 (as well as other memory banks of a multi-bank memory array). Instructions provided to state machine 920 are implemented according to control logic configurations, enabling state machine 920 to manage read, write, erase, data input, data output, and other functionality associated with memory cell array 902. In some aspects, state machine 920 can send and receive acknowledgments and negative acknowledgments regarding successful receipt or execution of various commands. In further embodiments, state machine 920 can decode and implement status-related commands, decode and implement configuration commands, and so on.

To implement read, write, erase, input, output, etc., functionality, state machine 920 can control clock source(s) 910 or reference and control signal generator(s) 918. Control of clock source(s) 910 can cause output pulses configured to facilitate row controller 904 and column controller 906 implementing the particular functionality. Output pulses can be transferred to selected bit lines by column controller 906, for instance, or word lines by row controller 904, for instance.

Figure 10:
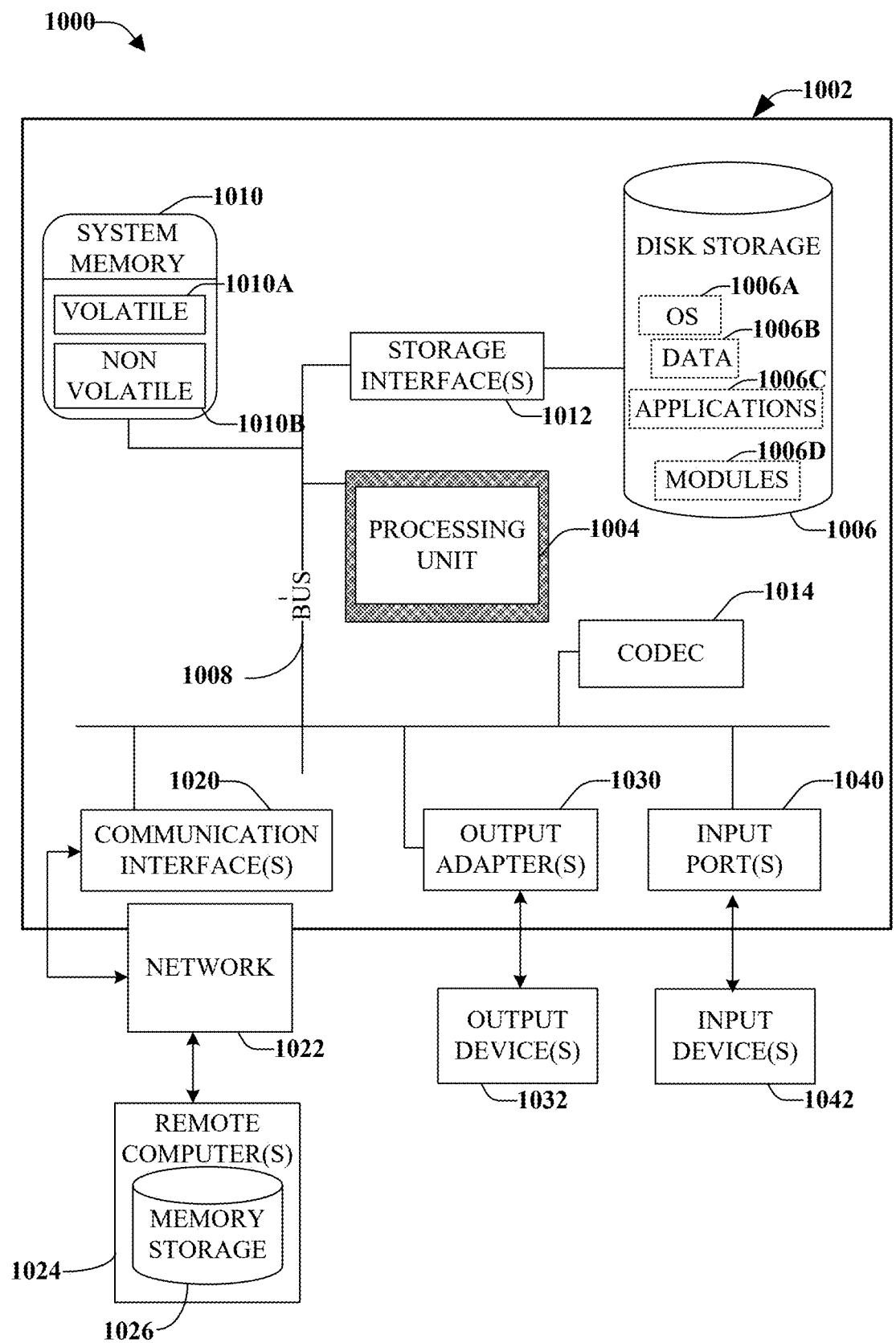
FIG. 10 depicts a block diagram of an example computing environment for implementing one or more embodiments of the present disclosure.

In connection with FIG. 10, the systems, devices, and/or processes described herein can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

With reference to FIG. 10, a suitable environment 1000 for implementing various aspects of the claimed subject matter includes a computer 1002. The computer 1002 includes a processing unit 1004, a system memory 1010, a codec 1014, and a system bus 1008. The system bus 1008 couples system components including, but not limited to, the system memory 1010 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), Small Computer Systems Interface (SCSI), Compute eXpress Link (CXL), high speed Serial Peripheral Interface (SPI) interfaces (e.g., HyperFlash, and so forth), Inter-Integrated Circuit (PC) communication protocol, I$^3$C protocol, etc.

The system memory 1010 includes volatile memory 1010A and non-volatile memory 1010B. The basic input/output system (BIOS), containing the basic routines to transfer information between elements within the computer 1002, such as during start-up, is stored in non-volatile memory 1010B. In addition, according to present innovations, codec 1014 may include at least one of an encoder or decoder, wherein the at least one of an encoder or decoder may consist of hardware, software, or a combination of hardware and software. Although codec 1014 is depicted as a separate component, codec 1014 may be contained within non-volatile memory 1010B. By way of illustration, and not limitation, non-volatile memory 1010B can include read only memory (ROM), programmable ROM (PROM), electrically programmable ROM (EPROM), electrically erasable programmable ROM (EEPROM), or flash memory, two-terminal memory, and so on. Volatile memory 1010A includes random access memory (RAM), and in some embodiments can embody a cache memory. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1002 may also include removable/non-removable, volatile/non-volatile computer storage medium. FIG. 10 illustrates, for example, disk storage 1006. Disk storage 1006 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1006 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1006 to the system bus 1008, a removable or non-removable interface is typically used, such as storage interface 1012. It is appreciated that storage devices 1006 can store information related to a user. Such information might be stored at or provided to a server or to an application running on a user device. In one embodiment, the user can be notified (e.g., by way of output device(s) 1032) of the types of information that are stored to disk storage 1006 or transmitted to the server or application. The user can be provided the opportunity to opt-in or opt-out of having such information collected and/or shared with the server or application (e.g., by way of input from input device(s) 1042).

It is to be appreciated that FIG. 10 describes software that acts as an intermediary between users and the basic computer resources described in the suitable operating environment 1000. Such software includes an operating system 1006A. Operating system 1006A, which can be stored on disk storage 1006, acts to control and allocate resources of the computer system 1002. Applications 1006C take advantage of the management of resources by operating system 1006A through program modules 1006D, and program data 1006D, such as the boot/shutdown transaction table and the like, stored either in system memory 1010 or on disk storage 1006. It is to be appreciated that the claimed subject matter can be implemented with various operating systems or combinations of operating systems.

A user enters commands or information into the computer 1002 through input device(s) 1042. Input devices 1042 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via input port(s) 1040. Input port(s) 1040 include, for example, a serial port, a parallel port, a game port, and a universal serial bus (USB). Output device(s) 1032 uses some of the same type of ports as input device(s) 1042. Thus, for example, a USB port may be used to provide input to computer 1002 and to output information from computer 1002 to an output device 1032. Output adapter 1030 is provided to illustrate that there are some output devices 1032 like monitors, speakers, and printers, among other output devices 1032, which require special adapters. The output adapters 1030 include, by way of illustration and not limitation, video and sound cards that provide a means of connection between the output device 1032 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1024. The remote computer(s) 1024 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1026 is illustrated with remote computer(s) 1024. Remote computer(s) 1024 is logically connected to computer 1002 through a network 1022 and then connected via communication interface(s) 1020. Network 1022 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication interface(s) 1020 refers to the hardware/software employed to connect the network 1022 to the bus 1008. While communication interface(s) 1020 is shown for illustrative clarity inside computer 1002, it can also be external to computer 1002. The hardware/software necessary for connection to the network 1022 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules or stored information, instructions, or the like can be located in local or remote memory storage devices.

Moreover, it is to be appreciated that various components described herein can include electrical circuit(s) that can include components and circuitry elements of suitable value in order to implement the embodiments of the subject disclosure. Furthermore, it can be appreciated that many of the various components can be implemented on one or more IC chips. For example, in one embodiment, a set of components can be implemented in a single IC chip. In other embodiments, one or more of respective components are fabricated or implemented on separate IC chips.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising".

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Further embodiments can be envisioned to one of ordinary skill in the art after reading this disclosure. For example, in various embodiments, erase operations may be initiated upon a plurality of ReRAM devices (e.g., 16, 32, etc.) at the same time.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An integrated circuit device, comprising:
   a memory control unit (MCU) device packaged within the integrated circuit device and comprising a first embedded memory that stores a MCU identifier associated with the MCU device;
   a secure element (SE) device packaged within the integrated circuit device and comprising a second embedded memory that stores a SE identifier for the SE device; and
   a two-terminal resistive switching memory (ReMEM) device comprising a plurality of ReMEM memory cells and wherein a ReMEM identifier is stored within a first subset of the plurality of ReMEM memory cells of the two-terminal ReMEM device; and
   a digital certificate stored in a second subset of the plurality of ReMEM memory cells of the two-terminal ReMEM device, wherein the digital certificate includes a validation code for the MCU identifier, a second validation code for the SE identifier and a third validation code for the ReMEM identifier.

2. The integrated circuit device of claim 1, wherein the validation code, the second validation code and the third validation code are validated by a manufacturer code associated with a manufacturer of the MCU device, of the SE device or of the integrated circuit device, and wherein a fourth validation code paired with the manufacturer code is stored at the first embedded memory of the MCU device.

3. The integrated circuit device of claim 1, wherein the SE device further comprises a SE memory control circuit communicably coupled to the second embedded memory, and further wherein both a read operation and a write operation are disabled for the SE identifier stored in the second embedded memory except for the SE memory control circuit.

4. The integrated circuit device of claim 1, wherein the MCU identifier is a private key of a public-private key pair specific to the MCU device, the SE identifier is a second private key of a second public-private key pair specific to the SE device and the ReMEM identifier is a private key of a third public-private key pair specific to the ReMEM device.

5. The integrated circuit device of claim 4, wherein the validation code for the MCU identifier is a public key of the public-private key pair specific to the MCU device, the second validation code is a second public key of the second public-private key pair specific to the SE device, and the third validation code is a third public key of the third public-private key part specific to the ReMEM device.

6. The integrated circuit device of claim 1, wherein the ReMEM identifier is a physical unclonable function (PUF) data sequence comprising a PUF bit generated from one or more ReMEM memory cells of the subset of the plurality of ReMEM memory cells utilizing a PUF data generation process.

7. The integrated circuit device of claim 6, wherein the PUF bit comprises at least two ReMEM memory cells in a differential coupling in which the PUF bit has a 0 binary value in response to a first of the at least two ReMEM memory cells having a program state and a second of the at least two ReMEM memory cells having an erase state, and the PUF bit has a 1 binary value in response to the second of the at least two ReMEM memory cells having the program state and the first of the at least two ReMEM memory cells having the erase state.

8. The integrated circuit device of claim 1, wherein the plurality of ReMEM memory cells are two-terminal filamentary switching cells, including a two-terminal filamentary switching cell comprising a conductive donor layer adjacent a non-conductive switching layer, wherein the two-terminal filamentary switching cell defines a program state in response to particles of the conductive donor layer forming a conductive filament through a portion of the non-conductive switching layer.

9. The integrated circuit device of claim 8, wherein:
the conductive donor layer contains a mixture, alloy or compound of a metal having a first electrical conductance;
the non-conductive switching layer contains a second mixture, alloy or compound of the metal having a second electrical conductance; and
the first electrical conductance is greater than the second electrical conductance.

10. The integrated circuit device of claim 9, wherein the metal is aluminum;
the first mixture, alloy or compound of the metal has a chemical formula: $AlM_x$ where M is oxygen or nitrogen;
the second mixture, alloy or compound of the metal has a chemical formula: $AlN_y$ where N is oxygen or nitrogen; and
where $y>x$.

11. The integrated circuit device of claim 1, wherein the MCU device, the SE device and the ReMEM device are monolithically integrated as part of the integrated circuit device.

12. The integrated circuit device of claim 1, wherein at least one of: the MCU device, the SE device or the ReMEM device is co-packaged with at least a second of: the MCU device, the SE device or the ReMEM device to form the integrated circuit device.

13. The integrated circuit device of claim 1, wherein the first subset of the plurality of ReMEM memory cells, the second subset of the plurality of ReMEM memory cells, or both, are located among metal layers of the integrated circuit device overlying a diffusion layer of the integrated circuit device.

* * * * *